(12) United States Patent
Shiono et al.

(10) Patent No.: US 11,029,457 B2
(45) Date of Patent: *Jun. 8, 2021

(54) OPTICAL FILTER

(71) Applicant: AGC Inc., Chiyoda-ku (JP)

(72) Inventors: Kazuhiko Shiono, Koriyama (JP);
Asana Yoshioka, Chiyoda-ku (JP);
Shoko Suzuki, Koriyama (JP); Hiroki Hotaka, Koriyama (JP)

(73) Assignee: AGC Inc., Chiyoda-ku (JP)

( * ) Notice: Subject to any disclaimer, the term of this patent is extended or adjusted under 35 U.S.C. 154(b) by 192 days.

This patent is subject to a terminal disclaimer.

(21) Appl. No.: 16/369,653

(22) Filed: Mar. 29, 2019

(65) Prior Publication Data

US 2019/0227208 A1    Jul. 25, 2019

Related U.S. Application Data

(63) Continuation of application No. 15/454,521, filed on Mar. 9, 2017, now Pat. No. 10,324,240, which is a (Continued)

(30) Foreign Application Priority Data

Sep. 19, 2014  (JP) .............................. JP2014-191601

(51) Int. Cl.
*F21V 9/04*  (2018.01)
*F21V 9/06*  (2018.01)
(Continued)

(52) U.S. Cl.
CPC ............ *G02B 5/208* (2013.01); *C09B 23/105* (2013.01); *C09B 57/007* (2013.01); *G02B 5/0808* (2013.01); *G02B 5/223* (2013.01)

(58) Field of Classification Search
CPC ... C09B 23/105; C09B 23/107; C09B 57/007; C08K 15/18; C08K 15/30; C08K 5/16;
(Continued)

(56) References Cited

U.S. PATENT DOCUMENTS 4,163,671 A   8/1979  Inoue et al.
6,794,431 B1  9/2004  Rosania
(Continued)

FOREIGN PATENT DOCUMENTS

DE   100 57 141 A1   5/2002
DE   101 09 243 A1   9/2002
(Continued)

OTHER PUBLICATIONS

International Search Report dated Dec. 15, 2015 in PCT/JP2015/076052, filed on Sep. 14, 2015.

*Primary Examiner* — Mustak Choudhury
(74) *Attorney, Agent, or Firm* — Oblon, McClelland, Maier & Neustadt, L.L.P.

(57) ABSTRACT

To provide an optical filter having shielding effects against near ultraviolet rays and near infrared rays. An optical filter comprising a transparent resin body having a single layer or multilayer structure, and containing a near ultraviolet absorbing dye (U) which is a compound represented by the following formula (U) and which has an absorption maximum at a wavelength of from 370 to 425 nm and has a molar absorptivity at the maximum absorption wavelength of at
(Continued)

least 50,000 [L/(mol·cm)], and a near infrared absorbing dye (A) which has an absorption maximum at a wavelength of from 600 to 800 nm:

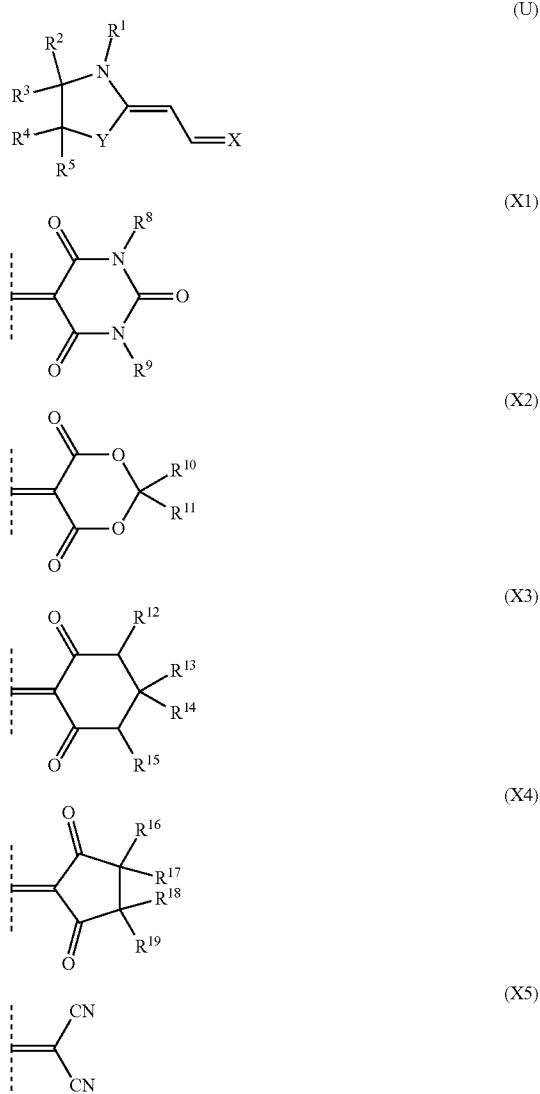

In the formula (U), Y is an oxygen atom, a methylene group or a dimethylene group, $R^1$ is a monovalent hydrocarbon group which may have a substituent, or the like, $R^2$ to $R^5$ are a hydrogen atom, an alkyl group, an alkoxy group or the like, and X is a bivalent group represented by any one of the formulae (X1) to (X5) or the like.

13 Claims, 1 Drawing Sheet

Related U.S. Application Data continuation of application No. PCT/JP2015/076052, filed on Sep. 14, 2015.

(51) Int. Cl.
| | | |
|---|---|---|
| *G02B 5/08* | (2006.01) | |
| *G02B 5/20* | (2006.01) | |
| *C09B 23/10* | (2006.01) | |
| *C09B 57/00* | (2006.01) | |
| *G02B 5/22* | (2006.01) | |

(58) Field of Classification Search
CPC ... C08K 5/17; C08K 5/19; C08K 5/29; C08K 5/42; C08K 5/132; C08K 5/134; C08K 5/3475; C08K 5/3492; C09D 5/32; C08F 2/44; C08F 20/00; G02B 5/003; G02B 5/0808; G02B 5/22; G02B 5/26; G02B 5/208; G02B 5/223; G02B 5/281–283; G02B 5/1838; H01L 27/14625; H01L 21/027
USPC ........ 359/350–359, 885; 252/582, 587, 589; 524/35, 261–264, 361, 376, 481, 588, 589
See application file for complete search history.

(56) References Cited

U.S. PATENT DOCUMENTS

| | | |
|---|---|---|
| 2002/0171606 A1 | 11/2002 | Yabuki |
| 2010/0324181 A1 | 12/2010 | Amasaki et al. |
| 2011/0057155 A1* | 3/2011 | Furuwaka ........ C08K 5/42 252/589 |
| 2014/0264202 A1 | 9/2014 | Nagaya et al. |
| 2015/0260889 A1 | 9/2015 | Shiono et al. |

FOREIGN PATENT DOCUMENTS

| | | |
|---|---|---|
| JP | 53-133033 | 11/1978 |
| JP | 7-62325 | 3/1995 |
| JP | 7-188189 | 7/1995 |
| JP | 2002-122731 | 4/2002 |
| JP | 2008-51985 | 3/2008 |
| JP | 2008-181028 | 8/2008 |
| JP | 2011-6517 | 1/2011 |
| JP | 2012-14043 | 1/2012 |
| JP | 2013-190553 | 9/2013 |
| WO | WO 2013/054864 A1 | 4/2013 |
| WO | WO 2014/002864 A1 | 1/2014 |
| WO | WO 2014/088063 A1 | 6/2014 |
| WO | WO 2014/163405 A1 | 10/2014 |
| WO | WO 2015/099060 A1 | 7/2015 |

\* cited by examiner

OPTICAL FILTER

TECHNICAL FIELD

The present invention relates to an optical filter having shielding effects against near ultraviolet rays and near infrared rays.

BACKGROUND ART

In recent years, for various applications, an optical filter which sufficiently transmits light in the visible wavelength region and which blocks light in the near ultraviolet wavelength region and the near infrared wavelength region has been used.

Hereinafter, "visible wavelength region", "(near) ultraviolet wavelength region" and "(near) infrared wavelength region" will be referred to as "visible region", "(near) ultraviolet region" and "(near) infrared region", respectively, and "light in the visible wavelength region", "light in the (near) ultraviolet wavelength region" and "light in the (near) infrared wavelength region" will be referred to as "visible light", "(near) ultraviolet light" and "(near) infrared light", respectively.

For example, in imaging devices using a solid-state imaging element (e.g. CCD or CMOS), such as a digital still camera, or in display devices using a light receiving element such as an automatic exposure meter, in order to achieve favorable color reproducibility, an optical filter has been used. The spectral sensitivity of the solid-state imaging element or the light receiving element ranges from the ultraviolet region to the near infrared region, whereas human eyes can detect only visible light.

Accordingly, in order to make the spectral sensitivity of the solid-state imaging element or the light receiving element close to the luminous factor of a human being, an optical filter is disposed on the subject side of the solid-state imaging element.

For such an optical filter, various systems are employed, for example, a reflection type filter in which dielectric thin films differing in the refractive index are alternately stacked (dielectric multilayer film) on one side or both sides of a transparent substrate to reflect light to be blocked employing interference of light. Of a filter having a dielectric multilayer film, optical properties may change since the optical film thickness of the dielectric multilayer film changes depending upon the angle of incidence of light. Accordingly, if such a filter is used, the spectral sensitivity of the solid-state imaging element may be influenced by the angle of incidence.

Whereas, Patent Documents 1 and 2 disclose as an optical filter which is less influenced by the angle of incidence of light at a wavelength of from 600 to 800 nm, one absorption type filter having an absorbing layer containing an absorbing dye in a transparent resin, or a filter having a dielectric multilayer film and an absorbing layer in combination. Further, the present applicant proposes an optical filter with reduced dependence on the angle of incidence of optical properties for light having a wavelength of from 600 to 800 nm (transmittance wavelength dependence) by incorporating a squarylium compound having a specific structure into a transparent resin (Patent Document 3). As mentioned above, of a filter having an absorbing layer, a change of optical properties by the angle of incidence of light tends to be small, whereby the influence of the angle of incidence of light having a wavelength of from 600 to 800 nm over the spectral sensitivity of the solid-state imaging element can be reduced.

Further, Patent Documents 4 to 6 disclose an optical filter having an absorbing layer containing a compound which absorbs light having a wavelength of from 380 to 420 nm. These Patent Documents disclose that the dependence on the angle of incidence of light having a wavelength of from 380 to 420 nm can be reduced.

Further, along with an improvement of a solid-state imaging element, an optical filter is required to be such that the wavelength at which the transmittance is 50% is at least 400 nm and that a change between a wavelength at which the transmittance is about 15% and a wavelength at which the transmittance is about 70% is steep.

Patent Documents 3 to 5 discloses, so as to reduce the dependence on the angle of incidence in the near ultraviolet region, an azomethine compound, an indole compound, a benzotriazole compound and a triazine compound.

However, with such compounds, the optical filter does not have a sufficient near ultraviolet absorbing performance and does not have a maximum absorption wavelength in an appropriate wavelength band. Accordingly, in order that the wavelength at which the transmittance is 50% is at least 400 nm efficiently, it is necessary to increase the amount of addition of such a compound or to increase the film thickness of the transparent resin.

However, if the amount of addition of the compound is increased or the thickness of the transparent resin is increased so as to satisfy the above optical properties, properties of the resin may be impaired. For example, in a case where a dielectric multilayer film as a light reflecting layer is formed on a glass substrate by deposition, a stress may occur between layers by the heating/cooling procedure in the evaporation step, and cracking or breakage may occur, and the possibility is increased also by a heating step in the production process other than the evaporation step. Further, in a case where an absorbing layer is formed on a glass substrate or a film substrate, the adhesion of the absorbing layer to the substrate tends to be inferior and separation may occur, and such is problematic in the reliability.

In order to solve the above problems and to secure sufficient shielding properties of the absorbing layer against light in both the near infrared region and the near ultraviolet region with a small amount of addition of the compound, both the near infrared absorbing dye and the near ultraviolet absorbing dye used are required to have a high absorptivity and have a sharp spectral transmittance curve (in this specification, the spectral transmittance curve will sometimes be referred to as "transmission spectrum") in a predetermined wavelength band.

However, an azomethine compound, triazine compound or benzotriazole compound dye has problems such that no sharp transmission spectrum in a predetermined wavelength band will be obtained, and such a compound is inferior in the heat resistance, and a change in optical properties is likely to occur in the thermal process.

PRIOR ART DOCUMENTS

Patent Documents

Patent Document 1: JP-A-2008-181028
Patent Document 2: JP-A-2008-051985
Patent Document 3: WO2014/088063
Patent Document 4: JP-A-2013-190553
Patent Document 5: WO2013/054864
Patent Document 6: WO2014/002864

DISCLOSURE OF INVENTION

Technical Problem

The object of the present invention is to overcome drawbacks of a conventional optical filter and to provide an optical filter with less dependence on the angle of incidence in the near infrared region and in the near ultraviolet region, being excellent in the visible region transmittance properties and the heat resistance, and having sufficient shielding properties even with a small amount of addition of the dye, and a highly sensitive imaging device.

Solution to Problem

The present invention provides the following optical filter.

An optical filter comprising a transparent resin body having a single layer or multilayer structure, wherein the transparent resin contains a near ultraviolet absorbing dye (U) which is a compound represented by the following formula (U) and which has an absorption maximum at a wavelength of from 370 to 425 nm and has a molar absorptivity at the maximum absorption wavelength of at least 50,000 [L/(mol·cm)], and a near infrared absorbing dye (A) which has an absorption maximum at a wavelength of from 600 to 800 nm:

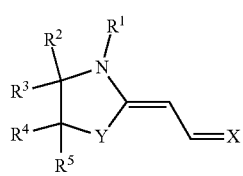
(U)

wherein Y is an oxygen atom, or a methylene group or dimethylene group to which $R^6$ and $R^7$ are bonded, $R^1$ is a $C_{1-16}$ monovalent hydrocarbon group which may have a substituent, $R^2$ to $R^7$ are each independently a hydrogen atom, a halogen atom, or a $C_{1-10}$ alkyl group or alkoxy group, and X is a bivalent group represented by any one of the following formulae (X1) to (X5) (wherein $R^8$ and $R^9$ are each independently a $C_{1-12}$ monovalent hydrocarbon group which may have a substituent, and $R^{10}$ to $R^{19}$ are each independently a hydrogen atom, or a $C_{1-12}$ monovalent hydrocarbon group which may have a substituent):

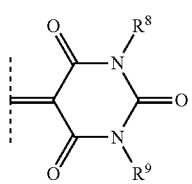
(X1)

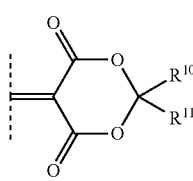
(X2)

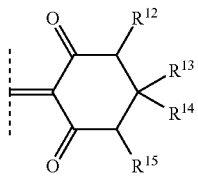
(X3)

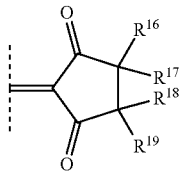
(X4)

(X5)

Advantageous Effects of Invention

In the optical filter of the present invention, the near infrared absorbing dye (A) and the near ultraviolet absorbing dye (U) used have such properties that the inclination in the vicinity of a visible region boundary in each of their spectral transmittance curves is steep, and they have high shielding performance in the absorption wavelength region. Accordingly, an absorbing layer formed by adding such dyes in a small amount to a transparent resin, even if it is a thin film, has excellent absorption properties, whereby the obtainable optical filter can be reduced in size and can be made thin, and its spectral transmittance curves are hardly changed by the thermal process, thanks to excellent heat resistance of the dyes.

DESCRIPTION OF EMBODIMENTS

Figure 1:
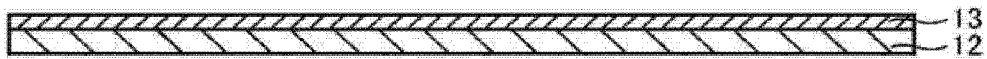
FIG. 1 is a cross-sectional view schematically illustrating an optical filter according to an embodiment of the present invention.

Now, embodiments of the present invention will be described.

The optical filter of the present invention (hereinafter sometimes referred to as the present filter) has a transparent resin body having a single layer or multilayer structure, and in the case of a transparent resin body having a multilayer structure, the dye (U) and the dye (A) may be contained in the same transparent resin layer or may be contained in different transparent resin layers.

In the optical filter, the refractive index of the transparent resin is preferably at least 1.45. In the transparent resin body having a multilayer structure, the respective layers may be made of the same transparent resin or may be made of different transparent resins.

The transparent resin body may, for example, be a film or sheet having a single layer or multilayer structure, or a film having a single layer or multilayer structure formed on a transparent substrate. The transparent substrate may, for example, be a glass substrate.

The present filter is preferably a film having a single layer structure containing the dye (U) and the dye (A) formed on a transparent substrate. Now, the present invention will be described with reference to a film having a single layer structure (hereinafter sometimes referred to as an absorbing layer).

In this specification, unless otherwise specified, the refractive index means a refractive index at a wavelength of 589 nm at 20° C. (hereinafter sometimes referred to as nd). Further, the maximum absorption wavelength (hereinafter sometimes referred to as λmax) of the dye is a value measured within a wavelength range of from 300 to 800 nm. The molar absorptivity (hereinafter sometimes referred to as ε) at the maximum absorption wavelength is a value measured by dissolving the dye in dichloromethane.

When the absorbing layer is used alone or in combination with another selective wavelength shielding member in the present filter, the absorbing layer has favorable near ultraviolet shielding function and near infrared shielding function, sufficient reduction in size, reduction in thickness and reduction in cost of an imaging device can be achieved, and excellent heat resistance is obtained.

Here, the absorbing layer having a favorable shielding function means that the inclinations in the vicinity of a boundary between the visible region and the near infrared region (wavelength: 600 to 700 nm) and in the vicinity of a boundary between the visible region and the near ultraviolet region (wavelength: 385 to 430 nm) in a spectral transmittance curve are steep, and the absorption wavelength region is broad, whereby there is substantially no wavelength region in which absorption is insufficient, when used in combination with another selective wavelength shielding member.

That is, in order to realize such steep inclinations, it is preferred that in the near ultraviolet region, there are a wavelength λ(UV15) at which the transmittance is 15% and a wavelength λ(UV70) at which the transmittance is 70% in a wavelength band of from 380 to 450 nm in the near ultraviolet region, and that λ(UV70)–λ(UV15) is at most 30 nm. λ(UV70)–λ(UV15) is more preferably at most 25 nm, further preferably at most 20 nm.

Similarly, in order to realize steep inclinations, it is preferred that in the near infrared region, there are a wavelength λ(IR15) at which the transmittance is 15% and a wavelength λ(IR70) at which the transmittance is 70% in a wavelength band of from 600 to 720 nm, and that λ(IR15)–λ(IR70) is at most 60 nm. λ(IR15)–λ(IR70) is more preferably at most 55 nm, further preferably at most 50 nm.

An embodiment in which the absorbing layer (transparent resin body) and another selective wavelength shielding member are used in combination as mentioned above will be described with reference to drawings.

The present filter according to an embodiment of the present invention comprises an absorbing layer 12 and a light reflecting layer 13. In the present filter, there may be a single absorbing layer 12 and a single light reflecting layer 13, there may be at least two layers of one of the two layers, or there may be at least two of both of the two layers. FIG. 1 illustrates a constitution example of the present filter comprising an absorbing layer 12 and a light reflecting layer 13.

Figure 2:
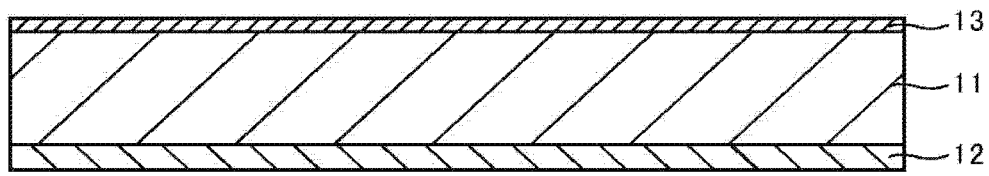
FIG. 2 is a cross-sectional view schematically illustrating a modified example of an optical filter according to an embodiment of the present invention.
Figure 3:
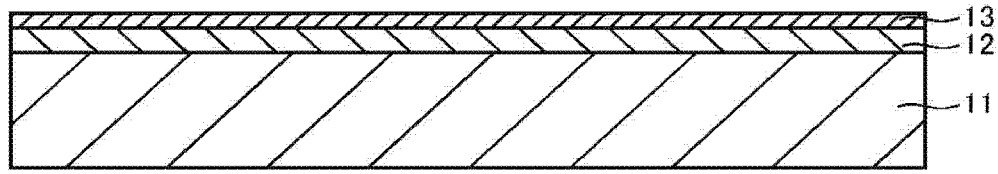
FIG. 3 is a cross-sectional view schematically illustrating a modified example of an optical filter according to an embodiment of the present invention.

Further, the absorbing layer 12 and the light reflecting layer 13 may be formed on the same principal plane of a transparent substrate 11 or may be on different principal planes. In a case where the absorbing layer 12 and the light reflecting layer 13 are formed on the same principal plane, the order of stacking of them is not limited. FIG. 2 illustrates an example of the present filter having an absorbing layer 12 on one principal plane of a transparent substrate 11 and a light reflecting layer 13 on the other principal plane of the transparent substrate 11. FIG. 3 illustrates an example of the present filter having an absorbing layer 12 and a light reflecting layer 13 on one principal plane of a transparent substrate 11.

Figure 4:
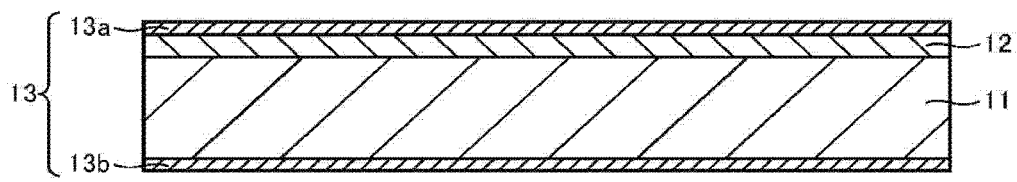
FIG. 4 is a cross-sectional view schematically illustrating a modified example of an optical filter according to an embodiment of the present invention.
Figure 5:
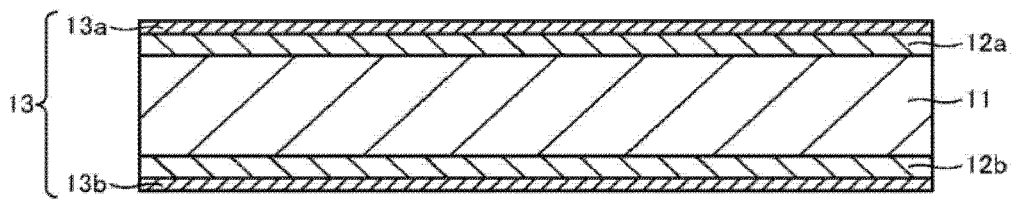
FIG. 5 is a cross-sectional view schematically illustrating a modified example of an optical filter according to an embodiment of the present invention.

FIG. 4 illustrates an example of the present filter having an absorbing layer 12 on one principal plane of a transparent substrate 11, and has light reflecting layers 13a and 13b on the principal plane of the absorbing layer 12 and on the other principal plane of the transparent substrate 11. FIG. 5 illustrates an example of the present filter having absorbing layers 12a and 12b on both principal planes of a transparent substrate 11 and further has light reflecting layers 13a and 13b on the principal planes of the absorbing layers 12a and 12b.

In the present filters shown in FIGS. 4 and 5, the two light reflecting layers 13a and 13b to be combined may be the same or different. Further, in the present filter shown in FIG. 5, the two absorbing layers 12a and 12b may be the same or different. In the case of a constitution in which the absorbing layer 12, or the first absorbing layer 12a or the second absorbing layer 12b constitute the outermost surface, a visible light transmittance loss will occur by reflection on the absorbing layer, and thus it is preferred to form an antireflection layer on the absorbing layer, although it is not shown. Further, in a case where the two absorbing layers 12a and 12b are different, one of them may be a near infrared absorbing layer made of a resin containing the dye (A), and the other may be a near ultraviolet absorbing layer made of a resin containing the dye (U). Further, the absorbing layer 12 in each of FIGS. 1 to 3 may be a stack having a two-layer structure consisting of the above near infrared absorbing layer and near ultraviolet absorbing layer.

The transparent substrate 11 is not particularly limited so long as it is made of a material which transmits visible light, and may be one having absorption properties in the near infrared region or in the near ultraviolet region. For example, an inorganic material such as glass or crystals, or an organic material such as a resin may be mentioned. The shape of the transparent substrate 11 is not particularly limited, and it may be a block, a plate or a film, its thickness is preferably from 0.03 to 5 mm, and from the viewpoint of the reduction in thickness, it is more preferably from 0.05 to 1 mm.

Further, the transparent substrate 11 is preferably made of an inorganic material from the viewpoint of optical properties of the obtainable optical filter, and shape stability relating to long-term reliability, for example, mechanical properties, and handling efficiency at the time of production of the filter. It is preferably made of glass from the viewpoint of processability.

The resin used for the transparent substrate 11 may, for example, be a polyester resin such as polyethylene terephthalate or polybutylene terephthalate, a polyolefin resin such as polyethylene, polypropylene or an ethylene/vinyl acetate copolymer, a norbornene resin, an acrylic resin such as polyacrylate or polymethyl methacrylate, a urethane resin, a vinyl chloride resin, a fluororesin, a polycarbonate resin, a polyvinyl butyral resin, a polyvinyl alcohol resin, a polyimide resin, a polyether sulfone resin or a polyallyl ether resin.

Glass which may be used for the transparent substrate 11 may, for example, be absorptive glass in which CuO or the like is added to fluorophosphate glass, phosphate glass or the like, soda lime glass, borosilicate glass, alkali-free glass or quartz glass. Particularly, absorptive glass is preferred, which has an absorption effect in a wide near infrared region of from 800 to 1,200 nm and which has stable absorption properties against obliquely incident light. The crystal material which may be used for the transparent substrate 11 may, for example, be birefringent crystals such as quartz, lithium niobate or sapphire.

In an imaging device such as a digital still camera, a low-pass filter for reducing moire or false color or a wavelength plate is used in some cases. In a case where birefringent crystals such as quartz, lithium niobate or sapphire are used as the material of the transparent substrate 11, functions of a low-pass filter or a wavelength plate may be imparted to the optical filter according to the present embodiment, and such is effective for downsizing and reduction in thickness of an imaging device, since the number of members can be reduced.

The light reflecting layer 13 (13a, 13b) in FIGS. 1 to 5 is composed of a dielectric multilayer film having a low refractive index dielectric film and a high refractive index dielectric film alternately stacked. Here, a low refractive index and a high refractive index mean a low refractive index and a high refractive index relative to the refractive index of the adjacent layer.

The high refractive index dielectric film has a refractive index (nd) of preferably at least 1.6, more preferably from 2.2 to 2.5. As a material of the high refractive index dielectric film, for example, $Ta_2O_5$, $TiO_2$ or $Nb_2O_5$ may be mentioned. Among them, in view of the film forming property, the reproducibility of e.g. the refractive index, the stability, etc., $TiO_2$ is preferred.

On the other hand, the low refractive index dielectric film has a refractive index (nd) of preferably less than 1.6, more preferably at least 1.45 and less than 1.55, further preferably from 1.45 to 1.47. As the material of the low refractive index dielectric film, for example, $SiO_xN_y$ may be mentioned. In view of the film-forming reproducibility, the stability, the economical efficiency, etc., $SiO_2$ is preferred.

The dielectric multilayer film may be formed, for example, by a vacuum film-forming process such as a CVD method, a sputtering method or a vacuum deposition method, or a wet film-forming process such as a spray method or a dipping method.

Of the dielectric multilayer film constituting the light reflecting layer 13, in a spectral transmittance curve at an angle of incidence of 0°, the average transmittance for light having a wavelength of from 430 to 620 nm is preferably at least 90%, more preferably at least 92%, further preferably at least 95%. Further, in a spectral transmittance curve at an angle of incidence of 0°, the average transmittance for light having a wavelength of from 710 to 1,100 nm is preferably at most 10%, more preferably at most 8%, further preferably at most 5%. Further, in a spectral transmittance curve at an angle of incidence of 0°, the average transmittance for light having a wavelength of from 350 to 400 nm is preferably at most 5%, more preferably at most 3%, further preferably at most 1%. Further, it is preferred that there are a wavelength at which the transmittance is 50% within a wavelength range of from 380 to 430 nm and a wavelength at which the transmittance is 50% within a wavelength range of from 650 to 750 nm.

To achieve the above, the dielectric multilayer film preferably has a total number of stacking of the low refractive index dielectric layer and the high refractive index dielectric layer of preferably 15 layers or more, more preferably 25 layers or more, further preferably 30 layers or more. However, if the total number of stacking increases, warpage or the like of the dielectric multilayer film tends to be large, and the entire film thickness increases. Therefore, it is preferably at most 100 layers, more preferably at most 75 layers, further preferably at most 60 layers. So long as the preferred stacking number is satisfied, the film thickness is preferably thin, in view of reduction in thickness of the optical filter. The film thickness of such a light reflecting layer (dielectric multilayer film) is preferably from 2 to 10 μm.

In the case of disposition such that the main surface of the transparent resin body corresponding to the absorbing layer 12 is in contact with the air, on the transparent resin layer, an antireflection layer may be provided, whereby reflection of visible light can be prevented. The antireflection layer may be realized, for example, by a dielectric multilayer film having a low refractive index dielectric film and a high refractive index dielectric film alternately stacked. Such an antireflection layer may be formed after formation of the transparent resin body.

For a near infrared cut film (hereinafter referred to as NIR filter), commonly, a selective wavelength shielding member which can block infrared light of at least 700 nm precisely and which can widely select the wavelength region blocked, is used. However, as described above, the dielectric multilayer film has dependence on the angle of incidence such that the reflection wavelength band shifts by the angle of incidence of light. A conventional NIR filter has a great dependence on the angle of incidence in the reflection wavelength band in the near ultraviolet region, and by the constitution as disclosed in Patent Document 3, no sufficient shielding function in the near ultraviolet region can be realized.

The present filter has a small change in the spectral transmittance curve by the dependence on the angle of incidence of light, even if it has a light reflecting layer composed of a dielectric multilayer film, and can sufficiently absorb light in the required wavelength region, due to absorption by the dyes (U) and (A). Further, in a spectral transmittance curve, since the inclinations of the light transmittance in the vicinity of the boundary between the visible region and the near ultraviolet region and in the vicinity of the boundary between the visible region and the near infrared region are steep, the transmittances in the inclined wavelength region in the transmittance spectrum, that is, the transmittance at the rising phase can be kept high, while the visible light transmittance is kept high. Further, by using highly heat resistant dyes (U) and (A), an optical filter having high thermal reliability can be obtained.

The heat resistance can be evaluated by the degree of the dye remaining ratio obtained by measuring the absorptivity at the maximum absorption wavelength of the dye contained, when the transparent resin body is heated at 150° C. for 5 hours. The dye remaining ratio [%] can be calculated from (absorptivity at the maximum absorption wavelength 5 hours later)/(initial absorptivity at the maximum absorption wavelength)×100. The dye remaining ratio should be at least 60%, preferably at least 70%, more preferably at least 80%, further preferably at least 90% for the visible light.

With respect to the present filter comprising the absorbing layer 12 and the light reflecting layer 13, as an index to a change of the spectral transmittance curve by the dependence on the angle of incidence of light, an average of absolute values of the differences between the transmittance at an angle of incidence of 0° and the transmittance at an angle of incidence of 30°, for light having a wavelength of from 385 to 430 nm, in spectral transmittance curves at angles of incidence of 0° and 30° in the near ultraviolet region. The average of the absolute values of the differences is preferably at most 8 [%/nm], more preferably at most 7 [%/nm], further preferably at most 6 [%/nm].

Further, an average of absolute values of differences between the transmittance at an angle of incidence of 00 and the transmittance at an angle of incidence of 30° for light having a wavelength of from 600 to 700 nm in spectral transmittance curves at angles of incidence of 0° and 30°, can be employed, as an index in the near infrared region. The average of the absolute values of the differences is preferably at most 8 [%/nm], more preferably at most 7 [%/nm], further preferably at most 6 [%/nm].

Now, terms used for the dye compounds in the present invention will be described.

"A hydrocarbon group" means a group consisting of carbon atoms and hydrogen atoms, having a linear structure, a cyclic structure or a combination thereof. It may, for example, be an alkyl group, an alkenyl group, an alkylene group, an aryl group, an arylene group or an araryl group.

"An aliphatic ring" is a carbon ring other than an aromatic ring, and may have an unsaturated bond. Further, it may be a ring having two or more aliphatic rings condensed. The aliphatic ring may, for example, be a cyclopentane ring, a cyclohexane ring or a cyclohexene ring. "An aromatic ring" means a ring having aromaticity, may be a condensed ring, and may, for example, be a benzene ring or a naphthalene ring.

Each of "an alkyl group", "an alkenyl group" and "an alkylene group" may be linear or branched.

"An aryl group" means a monovalent hydrocarbon group having at least one aromatic ring and having one hydrogen atom bonded to a carbon atom constituting the aromatic ring removed. The hydrogen atom bonded to the carbon atom constituting the aromatic ring may be substituted by a hydrocarbon group such as an alkyl group. The aryl group may, for example, be a phenyl group, a tolyl group, a xylyl group, a biphenylyl group or a naphthyl group. "An arylene group" means a bivalent hydrocarbon group having two hydrogen atoms bonded to carbon atoms constituting the aromatic ring removed. "An araryl group" means a group having at least one hydrogen atom in an alkyl group substituted by an aryl group. The araryl group may, for example, be a benzyl group, a diphenylmethyl group or a 2-phenylethyl group.

"The substituent" in a hydrocarbon group having a substituent means a group bonded to a carbon atom of a hydrocarbon group by an atom (excluding a hydrogen atom) other than the carbon atom, or a group bonded to a carbon atom of a hydrocarbon group by a carbon atom of a carbonyl group or a carbon atom of a cyano group. The atom (excluding a hydrogen atom) other than the carbon atom bonded to the carbon atom of a hydrocarbon group may, for example, be a halogen atom, an oxygen atom, a nitrogen atom or a sulfur atom. The substituent may, for example, be specifically an alkoxy group, an acyl group, an acyloxy group, an alkoxycarbonyl group, a cyano group, a dialky- lamino group, a monoalkylamino group, a monoarylamino group, an acylamino group, an acylalkylamino group, an acylarylamino group, a fluorine atom, a chlorine atom, a hydroxy group, a carboxy group, a sulfonic acid group, a sulfo group, a sulfonamide group or a ureide group. The number of substituent in the hydrocarbon group having a substituent may be two or more, and in such a case, different substituents may be present.

The dye (U) in the present invention is a near ultraviolet absorbing dye (U) which is a compound represented by the following formula (U) and which has an absorption maximum at a wavelength of from 370 to 425 nm and has a molar absorptivity at the maximum absorption wavelength of at least 50,000 [L/(mol·cm)].

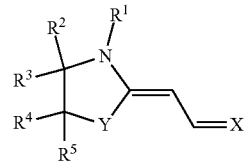

(U)

In the formula (U), Y is an oxygen atom, or a methylene group or dimethylene group to which $R^6$ and $R^7$ are bonded. The methylene group to which $R^6$ and $R^7$ are bonded is a group represented by —$CR^6R^7$—, and the dimethylene group in which $R^6$ and $R^7$ are bonded is a group which is a dimer of the methylene groups to which $R^6$ and $R^7$ are bonded, that is, a group represented by —$CR^6R^7$—$CR^6R^7$—. $R^6$ and $R^7$ are each independently a hydrogen atom, a halogen atom, or a $C_{1-10}$ alkyl group or alkoxy group. A plurality of $R^6$ may be the same or different, and a plurality of $R^7$ may also be the same or different. $R^6$ and $R^7$ are each independently preferably a hydrogen atom, a $C_{1-10}$ alkyl group or a $C_{1-10}$ alkoxy group, and it is more preferred that both are a hydrogen atom, or at least one is a hydrogen atom and the other is a $C_{1-4}$ alkyl group. Particularly preferably, $R^6$ and $R^7$ are both hydrogen atoms.

$R^1$ is a $C_{1-16}$ monovalent hydrocarbon group which may have a substituent. The monovalent hydrocarbon group preferably has from 1 to 12 carbon atoms. The monovalent hydrocarbon group having no substituent is preferably a $C_{1-12}$ alkyl group in which one or more of hydrogen atoms may be substituted by an aliphatic ring, an aromatic ring or an alkenyl group, a $C_{3-8}$ cycloalkyl group in which one or more of hydrogen atoms may be substituted by an aromatic ring, an alkyl group or an alkenyl group, or a $C_{6-12}$ aryl group in which one or more of hydrogen atoms may be substituted by an aliphatic ring, an alkyl group or an alkenyl group. The alkyl group, cycloalkyl group or aryl group in which one or more of hydrogen atoms may be substituted by an aliphatic ring or an aromatic ring is preferably a group having at most two aliphatic rings and aromatic rings in total, more preferably a group having one aliphatic ring or aromatic ring. The number of alkyl groups in the cycloalkyl group or aryl group in which one or more of hydrogen atoms are substituted by an alkyl group is not particularly limited, and is preferably at most 3, and the number of carbon atoms in the alkyl group is preferably at most 6. The aliphatic ring is preferably a 3- to 6-membered ring, and the aromatic ring is preferably a 6-membered ring.

In a case where $R^1$ is a non-substituted alkyl group, such an alkyl group may be linear or branched, and has more preferably from 1 to 6 carbon atoms.

The $C_{1-12}$ alkyl group in which one or more of hydrogen atoms are substituted by an aliphatic ring, an aromatic ring or an alkenyl group is more preferably a $C_{1-4}$ alkyl group having a $C_{3-6}$ cycloalkyl group or a $C_{1-4}$ alkyl group substituted by a phenyl group, particularly preferably a $C_{1-2}$ alkyl group substituted by a phenyl group. The alkyl group substituted by an alkenyl group means a group which is an alkenyl group as a whole but has no unsaturated bond between 1- and 2-positions, and may, for example, be an allyl group or a 3-butenyl group.

The hydrocarbon group having a substituent is preferably a hydrocarbon group having at least one alkoxy group, acyl group, acyloxy group, cyano group, dialkylamino group or chlorine atom. Such an alkoxy group, acyl group, acyloxy group and dialkylamino group preferably has from 1 to 6 carbon atoms.

$R^1$ is preferably a $C_{1-6}$ alkyl group in which one or more of hydrogen atoms may be substituted by a cycloalkyl group or a phenyl group.

$R^1$ is particularly preferably a $C_{1-6}$ alkyl group, specifically, a methyl group, an ethyl group, a propyl group, an isopropyl group, a butyl group, an isobutyl group, a t-butyl group or the like. Among them, a methyl group or an isopropyl group is preferred, since it is estimated that N in the cyanine structure is blocked with a bulky alkyl group, and deterioration by thermal motion can be suppressed.

$R^2$ to $R^5$ are each independently a hydrogen atom, a halogen atom or a $C_{1-10}$ alkyl group or alkoxy group. The alkyl group and alkoxy group preferably have from 1 to 6 carbon atoms, more preferably from 1 to 4 carbon atoms.

It is preferred that at least one of $R^2$ and $R^3$ is an alkyl group, and it is more preferred that both are alkyl groups. In a case where $R^2$ or $R^3$ is not an alkyl group, it is more preferably a hydrogen atom. It is particularly preferred that $R^2$ and $R^3$ are both $C_{1-6}$ alkyl groups.

It is preferred that at least one of $R^4$ and $R^5$ is a hydrogen atom, and it is more preferred that both are hydrogen atoms. In a case where $R^4$ or $R^5$ is not a hydrogen atom, it is preferably a $C_{1-6}$ alkyl group.

X is a bivalent group represented by any one of the following formulae (X1) to (X5).

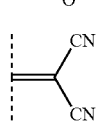
(X1)

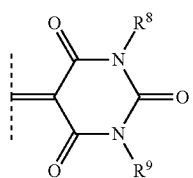
(X2)

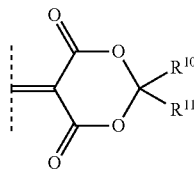
(X3)

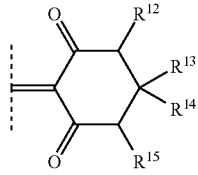
(X4)

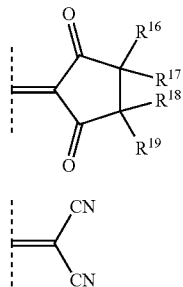
(X5)

In the formulae (X1) to (X5), $R^8$ and $R^9$ are each independently a $C_{1-12}$ monovalent hydrocarbon group which may have a substituent. $R^8$ and $R^9$ may be different groups but are preferably the same group.

The monovalent hydrocarbon group having no substituent is preferably a $C_{1-12}$ alkyl group in which one or more of hydrogen atoms may be substituted by an aliphatic ring, an aromatic ring or an alkenyl group, a $C_{3-8}$ cycloalkyl group in which one or more of hydrogen atoms may be substituted by an aromatic ring, an alkyl group or an alkenyl group, or a $C_{6-12}$ aryl group in which one or more of hydrogen atoms may be substituted by an aliphatic ring, an alkyl group or an alkenyl group.

In a case where $R^8$ and $R^9$ are a non-substituted alkyl group, such an alkyl group may be linear or branched, and has more preferably from 1 to 6 carbon atoms.

The $C_{1-12}$ alkyl group in which one or more of hydrogen atoms are substituted by an aliphatic ring, an aromatic ring or an alkenyl group is more preferably a $C_{1-4}$ alkyl group having a $C_{3-6}$ cycloalkyl group, or a $C_{1-4}$ alkyl group substituted by a phenyl group, particularly preferably a $C_{1-2}$ alkyl group substituted by a phenyl group. The alkyl group substituted by an alkenyl group means a group which is an alkenyl group as a whole but has no unsaturated bond between 1- and 2-positions, and may, for example, be an allyl group or a 3-butenyl group.

The monovalent hydrocarbon group having a substituent is preferably a hydrocarbon group having at least one alkoxy group, acyl group, acyloxy group, cyano group, dialkylamino group or chlorine atom. Such an alkoxy group, acyl group, acyloxy group and dialkylamino group preferably have from 1 to 6 carbon atoms.

$R^8$ and $R^9$ are each preferably a $C_{1-6}$ alkyl group in which one or more of hydrogen atoms may be substituted by a cycloalkyl group or a phenyl group.

$R^8$ and $R^9$ are each particularly preferably a $C_{1-6}$ alkyl group, specifically, for example, a methyl group, an ethyl group, a propyl group, an isopropyl group, a butyl group, an isobutyl group or a t-butyl group.

$R^{10}$ to $R^{19}$ are each independently a hydrogen atom or a $C_{1-12}$ monovalent hydrocarbon group which may have a substituent. The $C_{1-12}$ monovalent hydrocarbon group which may have a substituent is the same hydrocarbon group as the above $R^8$ and $R^9$. The $C_{1-12}$ monovalent hydrocarbon group which may have a substituent is preferably a $C_{1-6}$ alkyl group having no substituent.

$R^{10}$ and $R^{11}$ are each more preferably a $C_{1-6}$ alkyl group, and it is particularly preferred that $R^{10}$ and $R^{11}$ are the same alkyl group.

$R^{12}$ and $R^{15}$ are each preferably a hydrogen atom, or a $C_{1-6}$ alkyl group having no substituent. The two groups ($R^{13}$ and $R^{14}$, $R^{16}$ and $R^{17}$, and $R^{18}$ and $R^{19}$) bonded to the same carbon atom are preferably both hydrogen atoms or both $C_{1-6}$ alkyl groups.

The compound represented by the formula (U) is preferably a compound wherein Y is an oxygen atom, and X is (X1) or (X2), or a compound wherein Y is a methylene group to which $R^6$ and $R^7$ are bonded, and X is (X1), with a view to realizing steep inclination absorption properties and high absorbing performance and from the viewpoint of the position of λmax.

In a case where Y is an oxygen atom, (X) is more preferably (X1) or (X2) provided that $R^1$ is a $C_{1-6}$ alkyl group, $R^2$ and $R^3$ are both hydrogen atoms or both $C_{1-6}$ alkyl groups, or $R^4$ and $R^5$ are both hydrogen atoms. Particularly preferred is (X1) or (X2) when $R^1$ is a $C_{1-6}$ alkyl group, $R^2$ and $R^3$ are both $C_{1-6}$ alkyl groups, and $R^4$ and $R^5$ are both hydrogen atoms.

In the case of a compound wherein Y is a methylene group to which $R^6$ and $R^7$ are bonded, and X is (X1), preferred is a compound wherein X is (X1), and $R^1$ is a $C_{1-6}$ alkyl group, $R^2$ and $R^3$ are both hydrogen atoms or both $C_{1-6}$ alkyl groups, or all of $R^4$ to $R^7$ are hydrogen atoms, and more preferred is a compound wherein X is (X1), and $R^1$ is a $C_{1-6}$ alkyl group, and all of $R^2$ to $R^7$ are hydrogen atoms.

The compound represented by the formula (U) is preferably a compound wherein Y is an oxygen atom, and X is the above (X1) or (X2), particularly preferably a compound wherein Y is an oxygen atom and X is the above (X1).

As specific examples of the dye (U), compounds represented by the following formulae (U-1) to (U-18) may be mentioned. Hereinafter, these compounds will be referred to as dyes (U-1) to (U-18).

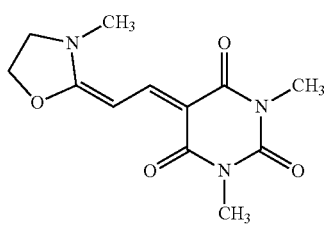
(U-1)

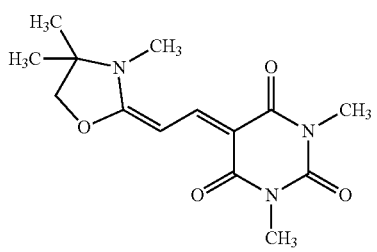
(U-2)

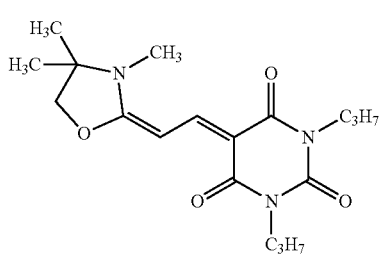
(U-3)

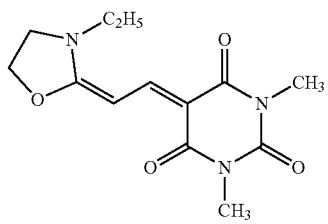
(U-4)

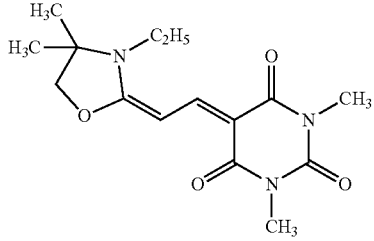
(U-5)

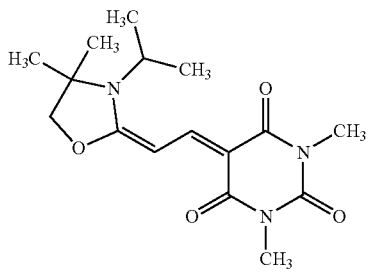
(U-6)

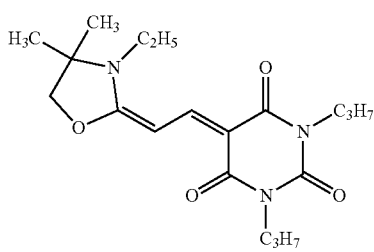
(U-7)

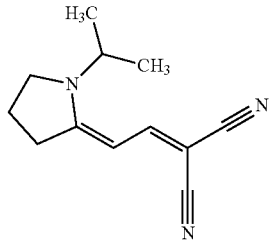
(U-8)

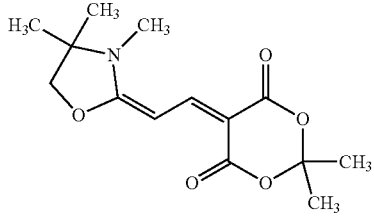
(U-9)

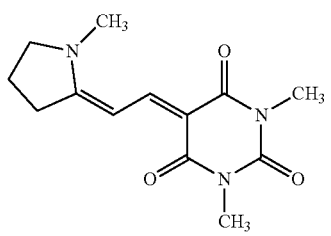
(U-10)

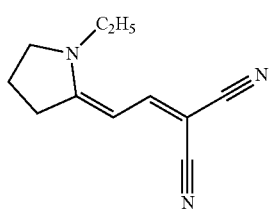
(U-11)

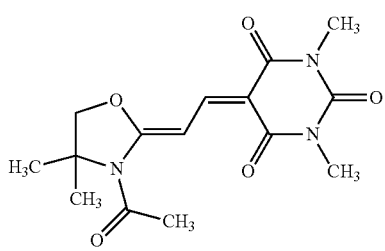
(U-12)

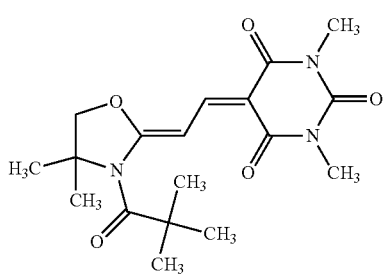
(U-13)

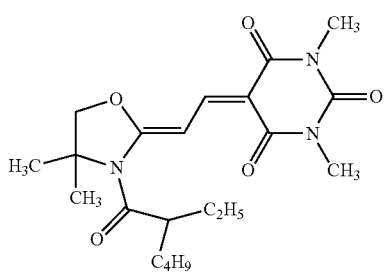
(U-14)

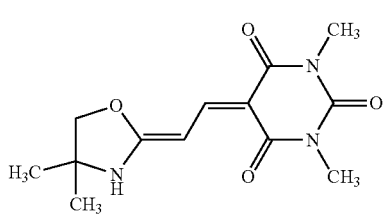
(U-15)

(U-16)

(U-17)

(U-18)

The dye (U) in the present invention is a near ultraviolet absorbing dye which is a compound represented by the above formula (U), and which has an absorption maximum at a wavelength of from 370 to 425 nm and has a molar absorptivity at the maximum absorption wavelength of at least 50,000 [L/(mol·cm)].

In order that in the spectral transmittance curve of the near ultraviolet absorbing dye, the inclination in the vicinity of the visible region boundary is steeper, the maximum absorption wavelength is preferably from 375 to 420 nm, more preferably from 378 to 410 nm. Further, in order to obtain a high shielding effect by blending in a smaller amount with the transparent resin, the molar absorptivity at the maximum absorption wavelength is preferably at least 60,000 [L/(mol·cm)], more preferably from 65,000 to 90,000 [L/(mol·cm)].

Further, the dye (U) has a high heat resistance, and in its spectral transmittance curve, a change during the thermal process is small.

As a dye (U) which can exhibit such preferred properties, as mentioned above, preferred is a dye which is a compound represented by the formula (U) wherein Y is an oxygen atom or a methylene group ($R^6$ and $R^7$ are hydrogen atoms), and X is the above (X1) or (X2), particularly preferably Y is an oxygen atom or a methylene group ($R^6$ and $R^7$ are hydrogen atoms) and X is the above (X1).

The dye (A) in the present invention is a near infrared absorbing dye which has an absorption maximum at a wavelength of from 600 to 800 nm. As the dye (A), a known near infrared absorbing dye may be used, and a squarylium dye, a phthalocyanine dye or a cyanine dye is preferred.

The squarylium dye may, for example, be a squarylium dye disclosed in Patent Document 3 (WO2014/088063), Patent Document 5 (WO2013/054864), Patent Document 6 (WO2014/002864), etc. The phthalocyanine dye may, for example, be a phthalocyanine dye disclosed in JP-A-2008-181028, JP-A-2008-051985, JP-A-2013-190553, WO2013/054864, etc. The cyanine dye may, for example, be a cyanine dye disclosed in Patent Document 5 (WO2013/054864), etc. However, the dye (A) in the present invention is not limited to known dyes.

The dye (A) in the present invention is preferably a squarylium dye, a phthalocyanine dye or a cyanine dye disclosed in WO2014/088063, WO2013/054864, WO2014/002864, etc. Among them, a squarylium dye disclosed in WO2014/088063 is more preferred, whereby the spectral transmittance curve will be steep, and excellent solubility and heat resistance will be obtained.

The dye (A) in present invention is particularly preferably the squarylium dye (A1) represented by the following formula (A1).

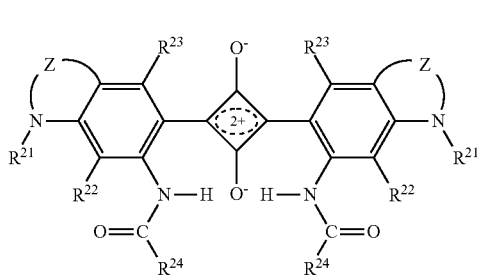

(A1)

In the formula (A1), Z is a dimethylene group (—$CH_2CH_2$—), trimethylene group (—$CH_2CH_2CH_2$—), oxymethylene group (—$OCH_2$—), 2-oxatrimethylene group (—$CH_2OCH_2$—) or $C_{5-6}$ 1,2-cycloalkylene group in which one or more or all of hydrogen atoms may be substituted by a group selected from a $C_{1-12}$ alkyl group and alkoxy group. Each of the above $C_{1-12}$ alkyl group and alkoxy group may form a ring.

Z is preferably the above bivalent group which has no substituent or in which one or more or all of hydrogen atoms are substituted by a $C_{1-6}$ alkyl group, more preferably a dimethylene group, oxymethylene group or 1,2-cyclopentylene group which has no substituent or in which one or more or all of hydrogen atoms are substituted by a $C_{1-6}$ alkyl group. The oxygen atom in the oxymethylene group is bonded to the carbon atom of the benzene ring.

In a case where Z is a dimethylene group, it is preferred that 2 or 3 hydrogen atoms among the four hydrogen atoms are substituted by an alkyl group, and the methylene group on the side bonded to the carbon atom of the benzene ring is preferably a dialkylmethylene group. Likewise, of the trimethylene group and the 2-oxatrimethylene group, the methylene group on the side bonded to the carbon atom of the benzene ring is preferably a dialkylmethylene group. In the case of the 1,2-cycloalkylene group, it preferably has no substituent.

$R^{21}$ is a $C_{1-12}$ monovalent hydrocarbon group which may have a substituent. The monovalent hydrocarbon group which may have a substituent may be as mentioned above. $R^{21}$ is preferably an alkyl group, cycloalkyl group, cycloalkyl-substituted alkyl group, aryl group or aralkyl group, which has no substituent, more preferably a $C_{1-6}$ alkyl group, cyclopentyl group, cyclohexyl group, phenyl group or phenyl-substituted alkyl group (alkyl moiety has 1 or 2 carbon atoms). Particularly, $R^{21}$ is preferably a $C_{1-6}$ alkyl group having no substituent.

$R^{22}$ and $R^{23}$ are each independently a hydrogen atom, a halogen atom or a $C_{1-10}$ alkyl group or alkoxy group. It is preferred that $R^{22}$ and $R^{23}$ are both hydrogen atoms or at least one of them is a $C_{1-6}$ alkyl group (the other one is a hydrogen atom), and it is more preferred that they are both hydrogen atoms.

$R^{24}$ is a $C_{1-25}$ monovalent hydrocarbon group which may have a substituent. The substituent is preferably a halogen atom, a hydroxy group, a carboxy group, a sulfo group, a cyano group or a $C_{1-10}$ alkoxy group.

The monovalent hydrocarbon group which may have a substituent may be as mentioned above. Among them, the hydrocarbon group having no substituent is preferably an alkyl group, a cycloalkyl group, a cycloalkyl-substituted alkyl group (alkyl group moiety has from 1 to 4 carbon atoms), an aryl group or an aralkyl group (alkyl group moiety has from 1 to 4 carbon atoms). It is more preferably a $C_{5-20}$ hydrocarbon group, and specifically, further preferably a $C_{5-20}$ alkyl group, a cyclopentyl group, a cyclohexyl group, a phenyl group or a phenyl-substituted alkyl group (alkyl group moiety has from 1 to 4 carbon atoms).

The hydrocarbon group having a substituent may, for example, be a cycloalkyl group or a cycloalkyl-substituted alkyl group having a substituent in an aliphatic ring, an aryl group or aralkyl group having a substituent in an aromatic ring, an alkoxy group-substituted alkyl group, or a cyano group-substituted alkyl group.

$R^{24}$ may, for example, be a cycloalkyl group, a cycloalkyl-substituted alkyl group (alkyl group moiety has from 1 to 4 carbon atoms), an aryl group, an aralkyl group, or a group having an alkoxy group in such an aliphatic ring or aromatic ring. Further, the alkyl group may be a $C_{5-20}$ branched alkyl group with the branch position of 1-position or 2-position. The cycloalkyl group is preferably a cyclopentyl group or a cyclohexyl group, the aryl group is preferably a phenyl group, and the aralkyl group is preferably a phenylalkyl group (the alkyl group moiety has from 1 to 4 carbon atoms).

As the specific dye (A1), dyes disclosed in the following Table 1 may be mentioned.

In Table, (N) in "(N)—Z—" means the nitrogen atom side. Further, "p" means binding on the para-position.

TABLE 1

| Dye | (N)—Z— | $R^{21}$ | $R^{22}$ | $R^{23}$ | $R^{24}$ |
|---|---|---|---|---|---|
| (A1-1) | (N)—$CH(CH_3)$—$C(CH_3)_2$— | —$CH(CH_3)_2$ | H | H | —$CH(CH_2H_6)$—$C_4H_3$ |
| (A1-2) | (N)—$CH(CH_3)$—$C(CH_3)_2$— | —$CH(CH_3)_2$ | H | H | —$CH_3$ |
| (A1-3) | (N)—$CH(CH_3)$—$C(CH_3)_2$— | —$CH(CH_3)_2$ | H | H | —$C_6H_{13}$ |
| (A1-4) | (N)—$CH(CH_3)$—$C(CH_3)_2$— | —$CH(CH_3)_2$ | H | H | —$C_6H_4$-p-$OC_7H_{15}$ |
| (A1-5) | (N)—$CH(CH_3)$—$C(CH_3)_2$— | —$CH(CH_3)_2$ | H | H | —$CH_2$—$C_2H_4$-p-$OCH_3$ |
| (A1-6) | (N)—$CH(CH_3)$—$C(CH_3)_2$— | —$C(CH_3)_2$—$C_2H_5$ | H | H | —$CH(C_2H_5)$—$C_4H_3$ |
| (A1-7) | (N)—$CH(CH_3)$—$C(CH_3)_2$— | —$C(CH_3)_2$—$C_2H_5$ | H | H | —$C(CH_3)_2$-$C_6H_{13}$ |
| (A1-8) | 1,2-cyclopentylene | —$CH(CH_3)_2$ | H | H | —$CH(C_2H_5)$—$C_4H_9$ |
| (A1-9) | 1,2-cyclopentylene | —$CH(CH_3)_2$ | H | H | —$CH_2$—CN |
| (A1-10) | (N)—$CH(CH_3)$—$C(CH_3)_2$— | —$C_2H_5$ | H | H | —$CH(C_2H_6)$—$C_4H_9$ |

The absorbing layer in the optical filter in the present invention is composed of a transparent resin body containing the dye (A) having an absorption maximum at a wavelength of from 600 to 800 nm and the dye (U) having an absorption maximum at a wavelength of from 370 to 425 nm. As the resin material used for such a transparent resin body, a transparent resin having no absorption in the visible region may be mentioned.

(Transparent resin)

The transparent resin as the material of the transparent resin body is a cured product of a thermoplastic resin or a thermosetting resin. Further, the transparent resin is required to have a refractive index of at least 1.45 as described above, preferably at least 1.5, more preferably at least 1.6. There is no upper limit of the refractive index of the transparent resin, but is at a level of 1.72 in view of availability, etc.

Further, the glass transition temperature (Tg) of the transparent resin is preferably from 0 to 380° C., more preferably from 40 to 370° C., further preferably from 100 to 360° C., still more preferably from 200 to 360° C. When the glass transition temperature (Tg) of the transparent resin is within the above range, deterioration or deformation by heat can be suppressed. Among such transparent resins, by a resin having high Tg, thermal motion of the dye can be suppressed and further thermal expansion of the resin itself can be suppressed, and accordingly when a dielectric multilayer film is formed on the resin, outer appearance failure due to cracking or the like can be decreased. A resin having Tg of from 200 to 360° C. may, for example, be a polyimide resin, a polyether sulfone resin or a polyallyl ether resin.

The transparent resin is preferably soluble in a solvent. In a case where the transparent resin is a cured product of a thermosetting resin, the thermosetting resin is preferably liquid or soluble in a solvent.

The dyes in the transparent resin are present as dissolved or dispersed in the transparent resin. It is preferred that a solvent solution containing the transparent resin and the dyes or a solvent solution containing a curable resin to be the transparent resin and the dyes is applied to a substrate, the solvent is removed (in the case of the curable resin, it is cured), to form a dye-containing transparent resin body in the form of a membrane or a film. Otherwise, without using a solvent, by melt-forming a mixture of the dyes and the transparent resin, a dye-containing transparent resin body in the form of a film or a sheet may be formed.

The transparent resin is specifically preferably at least one member selected from the group consisting of an acrylic resin, epoxy resin, enethiol resin, polycarbonate resin, polyether resin, polyarylate resin, polysulfone resin, polyether sulfone resin, polyparaphenylene resin, polyarylene ether phosphine oxide resin, polyimide resin, polyamide imide resin, polyolefin resin, cyclic olefin resin, and polyester resin, having a refractive index of at least 1.45. So long as the transparent resin has a refractive index of at least 1.45 as a whole, a mixed resin or a polymer alloy comprising such a resin and another transparent resin may be used.

Among them, from the viewpoint of the solubility of the dyes in the transparent resin and the transparency, the transparent resin is preferably an acrylic resin, a polyether resin, a polyester resin, a polycarbonate resin, an enethiol resin, an epoxy resin or a cyclic olefin. The polyester resin is preferably a polyethylene terephthalate resin, a polyethylene naphthalate resin or the like. The transparent resin is more preferably an acrylic resin, a polyester resin, a polycarbonate resin or a cyclic olefin resin. Further, for the application for which heat resistance is required, preferred is a polyester resin, polycarbonate resin, polyimide resin, polyallyl ether resin, polyether sulfone resin or the like having high Tg. The polyimide resin may, for example, be one disclosed in WO2008/4614A, WO2008/10494A, JP-A-2013-227500 or JP-A-2015-134843.

The transparent resin is preferably a polymer having polymerized units containing an aromatic ring or an aliphatic ring, from the viewpoint of the transparency and the refractive index. It may, for example, be a polymer having an aromatic ring such as a benzene ring, a naphthalene ring or a fluorene ring, or an aliphatic ring such as a cyclopentane ring, a cyclohexane ring or a bicycloheptane ring.

Specifically, it may, for example, be a transparent resin having a fluorene ring such as a polyester resin obtainable from a fluorene ring-containing diol such as 9,9-bis[4-(2-hydroxyethoxy)phenyl]fluorene or a polycarbonate resin obtainable from 9,9-bis(4-hydroxyphenyl)fluorene, or a transparent resin composed of a cyclic olefin polymer having a cyclopentane ring or a tricyclodecane ring.

The transparent resin composed of a polymer having polymerized units containing an aromatic ring or an aliphatic ring may, for example, be a resin having a fluorene ring or a 9,9-bisphenylfluorene ring. The resin having a fluorene ring or a 9,9-bisphenylfluorene ring is preferably an acrylic resin, a polycarbonate resin, a polyether resin or a polyester resin. Further, the fluorene ring may be incorporated into such a resin by copolymerization. Particularly preferred is a polycarbonate resin or a polyester resin from the viewpoint of the heat resistance, availability and the transparency.

The acrylic resin having a fluorene ring may, for example, be an acrylic resin obtainable by polymerizing a material component containing a 9,9-bisphenylfluorene derivative having one substituent having a (meth)acryloyl group at its terminal introduced, at least, to each of two phenyl groups of 9,9-bisphenylfluorene. In this specification, "(meth)acryloyl" generically means "methacryloyl" and "acryloyl".

Further, an acrylic resin obtainable by polymerizing a compound having a hydroxy group introduced to the above 9,9-bisphenylfluorene derivative having (meth)acryloyl groups and a urethane (meth)acrylate compound may be used. The urethane (meth)acrylate compound may be a compound obtainable as a reaction product of a (meth)acrylate compound having a hydroxy group and a polyisocyanate compound, or a compound obtainable as a reaction product of a (meth)acrylate compound having a hydroxy group, a polyisocyanate compound and a polyol compound.

The polyester resin having a fluorene ring introduced may be a polyester resin having a 9,9-bisphenyl fluorene derivative introduced as an aromatic diol may be mentioned. In such a case, the type of the dicarboxylic acid to be reacted with the aromatic diol is not particularly limited.

Such a polyester resin is suitably used as a transparent resin in view of the refractive index and transparency to visible light.

As the transparent resin, a commercially available product may be employed. The transparent resin is preferably a resin which has a refractive index of at least 1.45, and which undergoes no thermal deterioration and deformation when the dielectric multilayer film is formed by high temperature deposition conducted at a deposition temperature of at least 100° C. Further, preferred is a resin in which the dye will not undergo deterioration by processing at 150° C. or higher. Such an acrylic resin may, for example, be specifically a resin obtained by curing OGSOL (trademark) EA-F5003 (trade name, manufactured by Osaka Gas Chemicals Co., Ltd., refractive index: 1.60) or a thermoplastic acrylic resin such as BR50 (refractive index: 1.56) and BR52 (trade name, manufactured by MITSUBISHI RAYON CO., LTD.) As a commercial product of the polyester resin, OKPH4HT (trade name, manufactured by Osaka Gas Chemicals Co., Ltd., refractive index: 1.64), OKPH4 (trade name, manufactured by Osaka Gas Chemicals Co., Ltd., refractive index: 1.61), B-OKP2 (trade name, manufactured by Osaka Gas Chemicals Co., Ltd., refractive index: 1.64), OKP-850 (trade name, manufactured by Osaka Gas Chemicals Co., Ltd., refractive index: 1.65) or VYLON (trademark) 103 (manufactured by TOYOBO CO., LTD., refractive index: 1.55) may be mentioned, as the polyether sulfone resin, SUMIKAEXCEL (trademark) PES4800 (manufactured by Sumitomo Chemical Co., Ltd.) may be mentioned, as the polycarbonate resin, LeXan (trademark) ML9103 (manufactured by Sabic, refractive index: 1.59), SP3810 (trade name, manufactured by Teijin Chemicals Limited, refractive index: 1.63), SP1516 (trade name, manufactured by Teijin Chemicals Limited, refractive index: 1.60), TS2020 (trade name, manufactured by Teijin Chemicals Limited, refractive index: 1.59), ES5000, (trade name, manufactured by MITSUBISHI GAS CHEMICAL COMPANY, INC., refractive index: 1.63) or PANLITE (trademark) AM-8 series (manufactured by Teijin Chemicals Limited) may be mentioned. As the polymer alloy, as an alloy of a polycarbonate and a polyester, Xylex (trademark) 7505 (manufactured by Sabic) may be mentioned.

Further, a cyclic olefin polymer having high Tg may be used. As a commercial product, ARTON (trademark) (manufactured by JSR Corporation, refractive index: 1.51, Tg: 165° C.) or ZEONEX (trademark) (manufactured by Zeon Corporation, refractive index: 1.53, Tg: 138° C.) may be mentioned. Further, as the polyimide resin, NEOPULIM (trademark) C3650, C3630 or C3450 (manufactured by MITSUBISHI GAS CHEMICAL COMPANY, INC.), JL-20 (manufactured by New Japan Chemical Co., Ltd., trade name), HDN-20 (manufactured by New Japan Chemical Co., Ltd., trade name) or TP01 (manufactured by SOMAR, trade name) (such polyimide resins may contain silica) may, for example, be mentioned.

The film thickness of the absorbing layer is properly determined depending upon a disposition space within the device used, required absorption properties or the like, and is preferably from 0.1 to 100 μm. If the film thickness is less than 0.1 μm, the light absorbing performance may not sufficiently be obtained. Further, if the film thickness exceeds 100 μm, the flatness of the film may decrease, the absorptance may vary, and cracking or wrinkles may occur on the multilayer film by the thermal process. The film thickness is more preferably from 0.5 to 5.0 μm. Within such a range, it is possible to satisfy all of sufficient near ultraviolet absorbing performance and near infrared absorbing performance, flatness of the film thickness and suppression of wrinkles and cracking on the film.

In the present invention, the total content of the dyes (U) and (A) in the transparent resin is, as represented by the mass (PHR) of the dyes per 100 parts by mass of the transparent resin, preferably from 0.5 to 30, and with a view to reducing the film thickness, more preferably from 0.5 to 20. The content of the dye (U) is preferably from 0.1 to 20, more preferably from 0.5 to 15. The content of the dye (A) is preferably from 0.5 to 25, more preferably from 1.0 to 20.

Further, it is preferred that the following formula is satisfied, where $\alpha$ (μm) is the average thickness of the transparent resin body, and $\beta$ is the total mass of the dye (U) and the dye (A) in 100 parts by mass of the transparent resin:

$$\alpha \times \beta \leq 20$$

That is, in the optical filter which satisfies the above formula, a relatively thin absorbing layer is constituted by a relatively low dye content, and favorable optical properties are achieved. It is preferred that $\alpha \times \beta \leq 18$, more preferably $\alpha \times \beta \leq 16$.

With respect to the transparent resin body obtained by adding the dyes to the transparent resin, properties which the transparent resin intrinsically has may be impaired as the amount of the dyes added to the transparent resin increases. Such properties may, for example, be the heat resistance, the adhesion to a substrate and the coating flatness. Further, when a dielectric multilayer film such as an antireflection film is stacked on the transparent resin, breakage, wrinkles, etc. are likely to occur on the antireflection film by the thermal process for production. If the transparent resin body is thick, the above influence over the antireflection film, such as breakage and wrinkles, are likely to occur, and accordingly the transparent resin body is preferably as thin as possible with an amount of addition of the dyes sufficient to obtain desired absorbing performance, and such a constitution is preferred also from the viewpoint of the degree of freedom of the coating process.

For such a purpose, by using dyes having a large absorptivity disclosed in the present invention in combination, the transparent resin body can be obtained with a small amount of addition of the dyes to the transparent resin, can satisfy the relation between the film thickness and the dye addition amount of $\alpha \times \beta \leq 20$, and have desired optical properties. When the above formula is satisfied, problems resulting from the addition amount can be avoided, and such is advantageous also for achieving downsizing of the device. With a near ultraviolet absorbing dye having a molar absorptivity of less than 50,000 [L/(mol·cm)], the above formula is not satisfied (more than 20), and it is necessary to increase the addition amount in order to realized desired optical properties. If so, problems resulting from an increase of the film thickness of the transparent resin body and problems regarding solubility and precipitation are likely to arise. Further, the degree of freedom may decrease also from the viewpoint of downsizing of the optical filter. Whereas, the optical filter of the present invention, which employs near infrared absorbing dye and a near ultraviolet absorbing dye having a high molar absorptivity, satisfies the above formula, and influences of the dye addition amount over physical properties of the transparent resin body can be minimized.

The resin structure may be formed, for example, by dissolving or dispersing the dye (U), the near infrared absorbing dye (A) and the transparent resin or the material component of the transparent resin, and respective components to be blended as the case requires, in a solvent to prepare a coating liquid, applying the coating liquid to a substrate and drying the coating liquid, followed by curing as the case requires.

The solvent in which the dye (U), the dye (A), the transparent resin and the like are dissolved or dispersed is not particularly limited so long as it is a solvent in which the dye (U), the dye (A), the transparent resin or the material component of the transparent resin, and the respective components to be blended as the case requires, can be stably dispersed or dissolved. In this specification, the term "solvent" is meant to a concept including both a dispersion medium and a solvent. The solvent may, for example, be an alcohol, a ketone, an amide, a sulfoxide, an ether, an ester, an aliphatic halogenated hydrocarbon, an aliphatic hydrocarbon or a fluorinated solvent. Such solvents may be used alone or in combination of two or more.

The amount of the solvent is preferably from 10 to 5,000 parts by mass, more preferably from 30 to 2,000 parts by mass per 100 parts by mass of the transparent resin or the material component of the transparent resin. The content of the non-volatile component (solid content) in the coating liquid is preferably from 2 to 50 mass %, more preferably from 5 to 40 mass % based on the entire amount of the coating liquid.

The coating liquid may further contain a surfactant. Incorporation of the surfactant can improve the outer appearance, particularly, voids by very small bubbles, recesses by adhesion of foreign matters or the like and repelling in the drying step, can be reduced. The surfactant is not particularly limited and a known surfactant such as a cationic, anionic or nonionic surfactant may be used.

The solid content concentration of the transparent resin, the dye (U), the dye (A) and the like in the coating liquid depends on the method of applying the coating liquid and is usually within a range of from 10 to 60 mass %. If the solid content concentration is too low, unevenness in coating is likely to occur. On the other hand, if the solid content concentration is too high, the coating film tends to have poor outer appearance.

For coating of the coating liquid, a coating method such as a dip coating method, a cast coating method, a spray coating method, a spinner coating method, a bead coating method, a wire bar coating method, a blade coating method, a roller coating method, a curtain coating method, a slit die coater method, a gravure coater method, a slit reverse coater method, a microgravure coater method, an ink jet method or a comma coater method may be employed. In addition, a bar coater method, a screen printing method, a flexographic printing method or the like may also be employed.

Before application of the coating liquid, a pre-treatment may be applied to the transparent substrate 11 or a releasable substrate. As a pre-treatment agent, an aminoalkylsilane, a vinylsilane, 3-methacryloxypropyltrimethoxysilane, 3-chloropropyltrimethoxysilane or 3-mercaptopropyltrimethoxysilane may, for example, be used. They may be used alone or as a mixture of two or more.

After the coating liquid is applied to the substrate, it is dried to obtain an absorbing layer 12. For drying, a known method such as heat drying or hot air drying may be employed. In a case where the coating liquid contains a material component for the transparent resin, curing treatment is preferably further conducted. In the case of heat curing, drying and curing may be conducted simultaneously, and in the case of photocuring, a curing step should be provided separately from drying.

The absorbing layer 12 may contain, in addition to the above dye (U) and dye (A), within a range not to impair the effects of the present invention, various optional components which an absorbing layer of this type usually contains. The optional component may, for example, be a color tone correcting dye, a leveling agent, an antistatic agent, a heat stabilizer, a photostabilizer, an antioxidant, a dispersant, a flame retardant, a lubricant or a plasticizer. Further, it may also contain an ultraviolet absorber or a near infrared absorber other than the dye (U) and the dye (A) within a range not to impair the effects of the present invention.

The ultraviolet absorber other than the dye (U) may, for example, be a benzotriazole, benzophenone, salicylate, cyanoacrylate, triazine, oxanilide or nickel complex salt type absorber or another inorganic compound (such as zinc oxide, titanium oxide, cerium oxide, zirconium oxide, mica, kaolin or sericite).

As a commercial product, TINUVIN 346, TINUVIN 460 and TINUVIN 479 (manufactured by BASF, trade name (TINUVIN: registered trademark)) and BONA 3911 (manufactured by ORIENT CHEMICAL INDUSTRIES CO., LTD., trade name) may, for example, be mentioned.

As the near infrared absorber other than the dye (A), inorganic fine particles of e.g. ITO (indium tin oxide), ATO (antimony-doped tin oxide) and lanthanum boride may be mentioned.

Further, the absorbing layer 12 without the transparent substrate 11, which is formed by application and separated from the substrate, may also be used. The above substrate may be in a film-form or a sheet-form, and its material is not particularly limited so long as the substrate has releasability. Specifically, a glass plate, or a plastic film having release treatment applied thereto, for example, a film made of e.g. a polyester resin such as polyethylene terephthalate or polybutylene terephthalate, a polyolefin resin such as polyethylene, polypropylene or an ethylene-vinyl acetate copolymer, an acrylic resin such as polyacrylate or polymethyl methacrylate, a urethane resin, a vinyl chloride resin, a fluororesin, a polycarbonate resin, a polyvinyl butyral resin or a polyvinyl alcohol resin, or a stainless steel plate may be used.

Further, the absorbing layer may be produced in a film-form by extrusion. A light reflecting layer may be formed on one or both sides of such a film to constitute an optical filter. For example, in a case where a light reflecting layer is formed only on one side, an antireflection film is preferably formed on the other side.

EXAMPLES

Now, the present invention will be described in further detail with reference to Examples of the present invention and Comparative Examples.

For comparison with the dye (U) in the present invention, other near ultraviolet absorbing dye (hereinafter referred to as dye (B)) was evaluated. As the dye (B), the following dyes (B-1) to (B-3) were used.

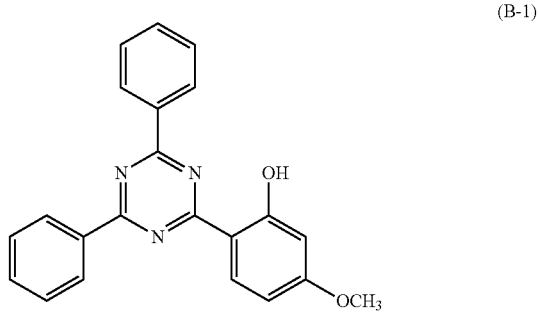

(B-1)

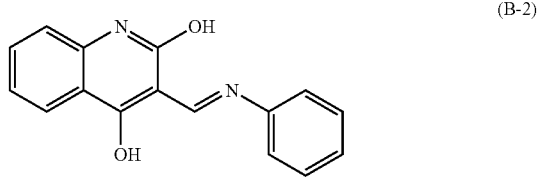

(B-2)

(B-3)

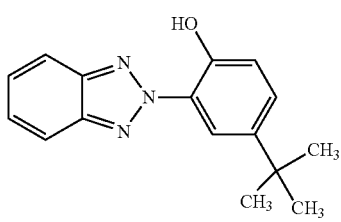

Example 1

[Evaluation]

The transmittance in each Ex. was calculated by measuring the spectral transmittance curve at a wavelength of from 300 to 800 nm using an ultraviolet visible spectrophotometer (manufactured by Hitachi High-Technologies Corporation, U-3300). Dichloromethane was used as a solvent, and the maximum absorption wavelength (λmax [unit: nm]) and the molar absorptivity (unit: [L/mol·cm)]) at that wavelength are shown. In the following Ex. also, the spectral transmittance curve was measured by using U-3300 manufactured by Hitachi High-Technologies Corporation.

TABLE 2

| Evaluation Ex. No. | Dye | λmax [nm] | ε (molar absorptivity) [L/(mol · cm)] |
|---|---|---|---|
| Eval. Ex. 1 | (U-2) | 396 | 85,628 |
| Eval. Ex. 2 | (U-9) | 379 | 68,968 |

TABLE 2-continued

| Evaluation Ex. No. | Dye | λmax [nm] | ε (molar absorptivity) [L/(mol · cm)] |
|---|---|---|---|
| Eval. Ex. 3 | (U-11) | 390 | 56,607 |
| Eval. Ex. 4 | (B-2) | 377 | 28,087 |
| Eval. Ex. 5 | (B-1) | 339 | 20,168 |
| Eval. Ex. 6 | (B-3) | 339 | 15,555 |

Example 2

The dye (U) illustrated in Table, the dye (A1-1) and fluorene ring-containing polyester OKP-850 were dissolved in a cyclohexanone solution, the solution was applied to a glass substrate and dried to prepare a dye-containing transparent resin body, and the transmission spectrum at a wavelength of from 300 to 800 nm was measured. The results are shown in Tables 3-1 and 3-2. Ex. 2-1 to 2-10 are Examples of the present invention, and Ex. 2-11 to 2-16 are Comparative Examples.

The dye concentration is represented by part by mass (PHR) of the dye in 100 parts by mass of the transparent resin (the same applies hereinafter). Further, in Tables, the IR absorption width is a band width within which the transmittance is at most 1% in the infrared region, the IR maximum absorption wavelength is the maximum absorption wavelength in the infrared region, and the UV maximum absorption wavelength is the maximum absorption wavelength in the ultraviolet region.

TABLE 3-1

| Ex. No. | Ex. 2-1 | Ex. 2-2 | Ex. 2-3 | Ex. 2-4 | Ex. 2-5 | Ex. 2-6 | Ex. 2-7 | Ex. 2-8 |
|---|---|---|---|---|---|---|---|---|
| Dye | (U-1) | (U-2) | (U-3) | (U-4) | (U-5) | (U-6) | (U-7) | (U-10) |
| IR maximum absorption wavelength (nm) | 717 | 717 | 717 | 717 | 717 | 717 | 717 | 717 |
| IR absorption width (nm) | 31 | 31 | 31 | 33 | 33 | 33 | 33 | 35 |
| λ(IR15) (nm) | 678 | 678 | 678 | 677 | 678 | 678 | 677 | 676 |
| λ(IR70) (nm) | 626 | 627 | 627 | 625 | 626 | 626 | 625 | 624 |
| λ(UV15) (nm) | 408 | 408 | 407 | 407 | 409 | 411 | 408 | 428 |
| λ(UV70) (nm) | 429 | 429 | 428 | 429 | 428 | 430 | 428 | 446 |
| λ(UV50) (nm) | 420 | 419 | 418 | 419 | 420 | 421 | 419 | 438 |
| λ(IR15)-λ(IR70) (nm) | 52 | 51 | 51 | 52 | 52 | 52 | 52 | 52 |
| λ(UV70)-λ(UV15) (nm) | 21 | 21 | 21 | 22 | 19 | 19 | 20 | 18 |
| UV maximum absorption wavelength (nm) | 401 | 401 | 401 | 401 | 401 | 403 | 402 | 417 |
| Dye (A) concentration (PHR) | 9 | 9 | 9 | 9 | 9 | 9 | 9 | 9 |
| Dye (U) concentration (PHR) | 4.5 | 4.5 | 4.5 | 4.5 | 4.5 | 4.5 | 4.5 | 4.5 |
| Film thickness (μm) | 1.0 | 1.0 | 1.0 | 1.0 | 1.0 | 1.0 | 1.0 | 1.0 |
| Film thickness × dye concentration | 13.3 | 13.1 | 13.4 | 13.7 | 13.1 | 13.0 | 13.4 | 13.6 |

TABLE 3-2

| Ex. No. | Ex. 2-9 | Ex. 2-10 | Ex. 2-11 | Ex. 2-12 | Ex. 2-13 | Ex. 2-14 | Ex. 2-15 | Ex. 2-16 |
|---|---|---|---|---|---|---|---|---|
| Dye | (U-8) | (U-8) | (B-1) | (B-2) | (B-3) | (B-1) | (B-2) | (B-3) |
| IR maximum absorption wavelength (nm) | 717 | 717 | 717 | 717 | 717 | 717 | 717 | 717 |
| IR absorption width (nm) | 34 | 34 | 36 | 33 | 34 | 28 | 32 | 34 |
| λ(IR15) (nm) | 676 | 676 | 676 | 677 | 677 | 680 | 678 | 677 |
| λ(IR70) (nm) | 625 | 626 | 624 | 626 | 626 | 626 | 625 | 626 |
| λ(UV15) (nm) | Not applicable | Not applicable | Not applicable | Not applicable | Not applicable | 397 | 390 | Not applicable |
| λ(UV70) (nm) | 424 | 423 | 424 | 425 | 417 | 429 | 424 | 420 |
| | | Not | Not | | | | | |

TABLE 3-2-continued

| Ex. No. | Ex. 2-9 | Ex. 2-10 | Ex. 2-11 | Ex. 2-12 | Ex. 2-13 | Ex. 2-14 | Ex. 2-15 | Ex. 2-16 |
|---|---|---|---|---|---|---|---|---|
| $\lambda$(UV50) (nm) | 406 | applicable | applicable | 407 | 361 | 416 | 369 | 361 |
| $\lambda$(IR15)-$\lambda$(IR70) (nm) | 51 | 50 | 52 | 51 | 51 | 54 | 53 | 51 |
| $\lambda$(UV70)-$\lambda$(UV15) (nm) | Not applicable | Not applicable | Not applicable | Not applicable | Not applicable | 32 | 34 | Not applicable |
| UV maximum absorption wavelength (nm) | 395 | 395 | 338 | 383 | 337 | 338 | 383 | 337 |
| Dye (A) concentration (PHR) | 9 | 9 | 9 | 9 | 9 | 9 | 9 | 9 |
| Dye (U) concentration (PHR) | 10 | 4.5 | 4.5 | 4.5 | 4.5 | 11 | 11 | 11 |
| Film thickness (μm) | 1.0 | 1.0 | 1.0 | 1.0 | 1.0 | 1.0 | 1.0 | 1.0 |
| Film thickness × dye concentration | 18.6 | 12.8 | 13.6 | 13.4 | 13.4 | 19.9 | 20.5 | 19.3 |

Example 3

The dye (U) illustrated in Table, the dye (A1-1) and fluorene ring-containing polyester B-OKP2 were dissolved in a cyclohexanone solution, the solution was applied to a glass substrate and dried to prepare a dye-containing transparent resin body, and the transmission spectrum at a wavelength of from 300 to 800 nm was measured. The results are shown in Tables 4-1 and 4-2. Ex. 3-1 to 3-7 are Examples of the present invention, and Ex. 3-8 to 3-13 are Comparative Examples.

As shown in Tables, in Ex. 3-1 to 3-7, the difference ($\lambda$(UV70)−$\lambda$(UV15)) between the wavelength $\lambda$(UV15) at which the transmittance is 15% and the wavelength $\lambda$(UV70) at which the transmittance is 70% within a wavelength range of from 380 to 430 nm, is at most 30 nm, and the wavelength $\lambda$(UV50) at which the transmittance is 50% is within a wavelength range of from 400 to 440 nm, and sufficient shielding performance is obtained within a desired wavelength band even with a film thickness of about 1 μm. In such a manner, the wavelength $\lambda$(UV50) is within a range of from 400 to 440 nm and is within a wavelength band suitable as an optical filter.

Further, the difference $\lambda$(IR15)−$\lambda$(IR70)) between the wavelength $\lambda$(IR15) at which the transmittance is 15% and the wavelength $\lambda$(IR70) at which the transmittance is 70% within a wavelength range of from 600 to 720 nm is at most 60 nm and the transmission spectrum is steep, and the wavelength band (IR absorption width) at which the transmittance is at most 1% within a wavelength range of from 650 to 800 nm is about 30 nm, and sufficient shielding performance is obtained also on the IR side.

In Ex. 3-8 to 3-13, the absorption performance is small, the maximum absorption wavelength is not suitable, or the transmission spectrum is not steep, and there is no Ex. in which all the above properties are satisfied.

TABLE 4-1I

| Ex. No. | Ex. 3-1 | Ex. 3-2 | Ex. 3-3 | Ex. 3-4 | Ex. 3-5 | Ex. 3-6 | Ex. 3-7 |
|---|---|---|---|---|---|---|---|
| Dye | (U-1) | (U-2) | (U-3) | (U-4) | (U-5) | (U-6) | (U-7) |
| IR maximum absorption wavelength (nm) | 716 | 716 | 716 | 716 | 716 | 716 | 717 |
| IR absorption width (nm) | 31 | 30 | 31 | 29 | 33 | 33 | 34 |
| $\lambda$(IR15) (nm) | 676 | 677 | 676 | 678 | 676 | 676 | 677 |
| $\lambda$(IR70) (nm) | 623 | 624 | 624 | 625 | 623 | 624 | 625 |
| $\lambda$(UV15) (nm) | 409 | 409 | 407 | 410 | 409 | 411 | 408 |
| $\lambda$(UV70) (nm) | 430 | 430 | 429 | 431 | 428 | 430 | 428 |
| $\lambda$(UV50) (nm) | 419 | 419 | 418 | 420 | 419 | 421 | 419 |
| $\lambda$(IR15)-$\lambda$(IR70) (nm) | 53 | 53 | 52 | 53 | 53 | 52 | 52 |
| $\lambda$(UV70)-$\lambda$(UV15) (nm) | 21 | 21 | 22 | 21 | 19 | 19 | 20 |
| UV maximum absorption wavelength (nm) | 400 | 399 | 401 | 401 | 401 | 403 | 401 |
| Dye (A) concentration (PHR) | 9 | 9 | 9 | 9 | 9 | 9 | 9 |
| Dye (U) concentration (PHR) | 4.5 | 4.5 | 4.5 | 4.5 | 4.5 | 4.5 | 4.5 |
| Film thickness (μm) | 1.0 | 0.9 | 1.0 | 0.9 | 1.0 | 1.0 | 1.0 |
| Film thickness × dye concentration | 13.3 | 12.7 | 12.8 | 12.7 | 13.5 | 13.1 | 12.9 |

TABLE 4-2

| Ex. No. | Ex. 3-8 | Ex. 3-9 | Ex. 3-10 | Ex. 3-11 | Ex. 3-12 | Ex. 3-13 |
|---|---|---|---|---|---|---|
| Dye | (B-1) | (B-2) | (B-3) | (B-1) | (B-2) | (B-3) |
| IR maximum absorption wavelength (nm) | 716 | 716 | 716 | 716 | 717 | 716 |
| IR absorption width (nm) | 33 | 31 | 33 | 30 | 27 | 32 |
| $\lambda$(IR15) (nm) | 675 | 677 | 676 | 679 | 680 | 676 |
| $\lambda$(IR70) (nm) | 624 | 625 | 624 | 627 | 628 | 626 |
| $\lambda$(UV15) (nm) | Not applicable | Not applicable | Not applicable | Not applicable | Not applicable | Not applicable |
| $\lambda$(UV70) (nm) | 418 | 424 | 422 | 376 | 426 | 415 |
| $\lambda$(UV50) (nm) | Not applicable | 405 | Not applicable | Not applicable | 413 | Not applicable |
| $\lambda$(IR15)-$\lambda$(IR70) (nm) | 51 | 52 | 52 | 52 | 52 | 50 |
| $\lambda$(UV70)-$\lambda$(UV15) (nm) | Not applicable | Not applicable | Not applicable | Not applicable | Not applicable | Not applicable |
| UV maximum absorption wavelength (nm) | 333 | 383 | 333 | 333 | 383 | 333 |
| Dye (A) concentration (PHR) | 9 | 9 | 9 | 9 | 9 | 9 |
| Dye (U) concentration (PHR) | 4.5 | 4.5 | 4.5 | 9 | 9 | 9 |
| Film thickness (μm) | 1.0 | 0.9 | 0.9 | 1.0 | 0.9 | 0.9 |
| Film thickness × dye concentration | 12.9 | 12.7 | 12.7 | 17.1 | 16.8 | 15.9 |

Example 4

The dye (U) shown in Table, the dye (A1-1) and polycarbonate resin SP1516 were dissolved in a cyclohexanone solution, and the solution was applied to a glass substrate and dried to prepare a dye-containing transparent resin body, and the transmission spectrum at a wavelength of from 300 to 800 nm was measured. The results are shown in Tables 5-1 and 5-2. Ex. 4-1 to 4-4 are Examples of the present invention, and Ex. 4-5 to 4-11 are Comparative Examples.

As shown in Tables, in Ex. 4-1 to 4-4, the difference $\lambda$(UV70)–$\lambda$(UV15)) between the wavelength $\lambda$(UV15) at which the transmittance is 15% and the wavelength $\lambda$(UV70) at which the transmittance is 70% within a wavelength range of from 380 to 430 nm is at most 30 nm and the wavelength $\lambda$(UV50) at which the transmittance is 50% is within a wavelength range of from 400 to 440 nm, and sufficient shielding performance is obtained within a desired wavelength band even with a film thickness of about 1 μm. In such a manner, the wavelength $\lambda$(UV50) is within a wavelength range of from 400 to 440 nm and is within a wavelength band suitable as an optical filter.

Further, the difference ($\lambda$(IR15)–$\lambda$(IR70)) between the wavelength $\lambda$(IR15) at which the transmittance is 15% and the wavelength $\lambda$(IR70) at which the transmittance is 70% within a wavelength range of from 600 to 720 nm, is at most 60 nm and the transmission spectrum is steep, and the wavelength band (IR absorption width) at which the transmittance is at most 1% within a wavelength range of from 650 to 800 nm is about 30 nm, and sufficient shielding performance is obtained also on the IR side.

In Ex. 4-5 to 4-11, the absorption performance is small, the maximum absorption wavelength is not suitable, or the transmission spectrum is not steep, and there is no Ex. in which the above properties are satisfied.

TABLE 5-1

| Ex. No. | Ex. 4-1 | Ex. 4-2 | Ex. 4-3 | Ex. 4-4 |
|---|---|---|---|---|
| Dye | (U-1) | (U-2) | (U-5) | (U-6) |
| IR maximum absorption wavelength (nm) | 714 | 714 | 714 | 714 |
| IR absorption width (nm) | 27 | 28 | 27 | 27 |
| $\lambda$(IR15) (nm) | 677 | 677 | 678 | 678 |
| $\lambda$(IR70) (nm) | 627 | 627 | 628 | 628 |
| $\lambda$(UV15) (nm) | 406 | 407 | 407 | 408 |
| $\lambda$(UV70) (nm) | 425 | 425 | 425 | 425 |
| $\lambda$(UV50) (nm) | 417 | 417 | 417 | 418 |
| $\lambda$(IR15) – $\lambda$(IR70) (nm) | 50 | 50 | 50 | 50 |
| $\lambda$(UV70) – $\lambda$(UV15) (nm) | 19 | 18 | 18 | 17 |
| UV maximum absorption wavelength (nm) | 399 | 400 | 400 | 402 |
| Dye (A) concentration (PHR) | 9 | 9 | 9 | 9 |
| Dye (U) concentration (PHR) | 4.5 | 4.5 | 4.5 | 4.5 |
| Film thickness (μm) | 0.9 | 0.9 | 0.9 | 0.9 |
| Film thickness × dye concentration | 12.0 | 11.8 | 11.9 | 11.4 |

TABLE 5-2

| Ex. No. | Ex. 4-5 | Ex. 4-6 | Ex. 4-7 | Ex. 4-9 | Ex. 4-10 | Ex. 4-11 |
|---|---|---|---|---|---|---|
| Dye | (B-1) | (B-2) | (B-3) | (B-1) | (B-2) | (B-3) |
| IR maximum absorption wavelength (nm) | 714 | 714 | 714 | 714 | 714 | 714 |
| IR absorption width (nm) | 29 | 27 | 27 | 28 | 25 | 29 |
| $\lambda$(IR15) (nm) | 678 | 678 | 678 | 679 | 680 | 678 |
| $\lambda$(IR70) (nm) | 629 | 629 | 629 | 629 | 630 | 629 |
| $\lambda$(UV15) (nm) | Not applicable | Not applicable | Not applicable | Not applicable | Not applicable | Not applicable |
| $\lambda$(UV70) (nm) | Not applicable | 418 | Not applicable | Not applicable | 420 | Not applicable |
| $\lambda$(UV50) (nm) | Not applicable | Not applicable | Not applicable | Not applicable | 406 | Not applicable |
| $\lambda$(IR15)-$\lambda$(IR70) (nm) | 49 | 49 | 49 | 50 | 50 | 49 |
| $\lambda$(UV70)-$\lambda$(UV15) (nm) | Not applicable | Not applicable | Not applicable | Not applicable | Not applicable | Not applicable |
| UV maximum absorption wavelength (nm) | 339 | 383 | 339 | 339 | 383 | 339 |

TABLE 5-2-continued

| Ex. No. | Ex. 4-5 | Ex. 4-6 | Ex. 4-7 | Ex. 4-9 | Ex. 4-10 | Ex. 4-11 |
|---|---|---|---|---|---|---|
| Dye (A) concentration (PHR) | 9 | 9 | 9 | 9 | 9 | 9 |
| Dye (U) concentration (PHR) | 4.5 | 4.5 | 4.5 | 9 | 9 | 9 |
| Film thickness (μm) | 0.9 | 0.9 | 0.9 | 0.9 | 0.9 | 0.9 |
| Film thickness × dye concentration | 11.8 | 11.7 | 11.5 | 15.9 | 15.3 | 15.4 |

Example 5

The dye (U) shown in Table, the dye (A1-1) and cycloolefin polymer ARTON (trademark: manufactured by JSR Corporation) were dissolved in a cyclohexanone solution, and the solution was applied to a glass substrate and dried to prepare a dye-containing transparent resin body, and the transmission spectrum at a wavelength of from 300 to 800 nm was measured. The results are shown in Tables 6-1 and 6-2. Ex. 5-1 to 5-5 are Examples of the present invention, and Ex. 5-6 to 5-10 are Comparative Examples.

As shown in Tables, in Ex. 5-1 to 5-5, the difference ($\lambda(UV70)-\lambda(UV15)$) between the wavelength $\lambda(UV15)$ at which the transmittance is 15% and the wavelength $\lambda(UV70)$ at which the transmittance is 70% within a wavelength range of from 380 to 430 nm is at most 30 nm, and the wavelength $\lambda(UV50)$ at which the transmittance is 50% is within a wavelength range of from 400 to 440 nm, and sufficient shielding performance is obtained within a desired wavelength band even with a film thickness of about 1 μm. In such a manner, the wavelength $\lambda(UV50)$ is within a wavelength range of from 400 to 440 nm and is within a wavelength band suitable as an optical filter.

Further, the difference ($\lambda(IR15)-\lambda(IR70)$) between the wavelength $\lambda(IR15)$ at which the transmittance is 15% and the wavelength $\lambda(IR70)$ at which the transmittance is 70% within a wavelength range of from 600 to 720 nm is at most 60 nm and the transmission spectrum is steep, and the wavelength band (IR absorption width) at which the transmittance is at most 1% within a wavelength range of from 650 to 800 nm is about 30 nm, and sufficient shielding performance is obtained also on the IR side.

In Ex. 5-6 to 5-10, the absorption performance is small, the maximum absorption wavelength is not suitable, or the transmission spectrum is not steep, and there is no Ex. in which the above properties are satisfied.

TABLE 6-1

| | Ex. No. | | | | |
|---|---|---|---|---|---|
| | Ex. 5-1 | Ex. 5-2 | Ex. 5-3 | Ex. 5-4 | Ex. 5-5 |
| Dye | (U-2) | (U-3) | (U-5) | (U-6) | (U-7) |
| IR maximum absorption wavelength (nm) | 705 | 705 | 706 | 706 | 708 |
| IR absorption width (nm) | 31 | 32 | 31 | 32 | 31 |
| $\lambda(IR15)$ (nm) | 672 | 672 | 672 | 672 | 672 |
| $\lambda(IR70)$ (nm) | 623 | 623 | 623 | 623 | 623 |
| $\lambda(UV15)$ (nm) | 405 | 404 | 407 | 407 | 405 |
| $\lambda(UV70)$ (nm) | 423 | 423 | 424 | 425 | 423 |
| $\lambda(UV50)$ (nm) | 415 | 415 | 416 | 417 | 415 |
| $\lambda(IR15) - \lambda(IR70)$ (nm) | 49 | 49 | 49 | 49 | 49 |
| $\lambda(UV70) - \lambda(UV15)$ (nm) | 18 | 19 | 17 | 18 | 18 |
| UV maximum absorption wavelength (nm) | 398 | 399 | 399 | 401 | 401 |
| Dye (A) concentration (PHR) | 6 | 6 | 6 | 6 | 6 |
| Dye (U) concentration (PHR) | 3 | 3 | 3 | 3 | 3 |
| Film thickness (μm) | 1.5 | 1.5 | 1.5 | 1.6 | 1.5 |
| Film thickness × dye concentration | 13.6 | 13.9 | 13.7 | 14.1 | 13.6 |

TABLE 6-2

| | Ex. No. | | | | |
|---|---|---|---|---|---|
| | Ex. 5-6 | Ex. 5-7 | Ex. 5-8 | Ex. 5-9 | Ex. 5-10 |
| Dye | (B-1) | (B-2) | (B-3) | (B-1) | (B-3) |
| IR maximum absorption wavelength (nm) | 708 | 707 | 707 | 708 | 707 |
| IR absorption width (nm) | 33 | 32 | 31 | 48 | 46 |
| $\lambda(IR15)$ (nm) | 671 | 671 | 671 | 663 | 662 |
| $\lambda(IR70)$ (nm) | 623 | 621 | 623 | 615 | 614 |
| $\lambda(UV15)$ (nm) | Not applicable | Not applicable | Not applicable | Not applicable | Not applicable |
| $\lambda(UV70)$ (nm) | 413 | 420 | Not applicable | 433 | 427 |
| $\lambda(UV50)$ (nm) | Not applicable | Not applicable | Not applicable | Not applicable | Not applicable |
| $\lambda(IR15) - \lambda(IR70)$ (nm) | 48 | 50 | 48 | 48 | 48 |
| $\lambda(UV70) - \lambda(UV15)$ (nm) | Not applicable | Not applicable | Not applicable | Not applicable | Not applicable |
| UV maximum absorption wavelength (nm) | 334 | 397 | 330 | 334 | 330 |
| Dye (A) concentration (PHR) | 6 | 6 | 6 | 9 | 9 |
| Dye (U) concentration (PHR) | 3 | 3 | 3 | 9 | 9 |
| Film thickness (μm) | 1.5 | 1.5 | 1.4 | 1.5 | 1.5 |
| Film thickness × dye concentration | 13.6 | 13.4 | 13.0 | 26.9 | 26.9 |

Example 6

The dye (U) shown in Table, the dye (A1-1) and polycarbonate resin SP3810 (trade name, manufactured by Teijin Chemicals Limited) were dissolved in a cyclohexanone solution, and the solution was applied to a glass substrate and dried to prepare a dye-containing transparent resin body, and the transmission spectrum at a wavelength of from 300 to 800 nm was measured. The results are shown in Tables 7-1 and 7-2. Ex. 6-1 to 6-4 are Examples of the present invention, and Ex. 6-5 to 6-10 are Comparative Examples.

In Ex. 6-1 to 6-4, the difference ($\lambda$(UV70)−$\lambda$(UV15)) between the wavelength $\lambda$(UV15) at which the transmittance is 15% and the wavelength $\lambda$(UV70) at which the transmittance is 70% within a wavelength range of from 380 to 430 nm is at most 30 nm, and the wavelength $\lambda$(UV50) at which the transmittance is 50% is within a wavelength range of from 400 to 440 nm, and sufficient shielding performance is obtained within a desired wavelength band even with a film thickness of about 1.0 μm. In such a manner, the wavelength $\lambda$(UV50) is within a wavelength range of from 400 to 440 nm and is within a wavelength band suitable as an optical filter.

Further, the difference between the wavelength $\lambda$(IR15) at which the transmittance is 15% and the wavelength $\lambda$(IR70) at which the transmittance is 70% within a wavelength range of from 600 to 720 nm is at most 60 nm and the transmission spectrum is steep, and the wavelength band (IR absorption width) at which the transmittance is at most 1% within a wavelength range of from 650 to 800 nm is about 30 nm, and sufficient shielding performance is obtained also on the IR side.

In Ex. 6-5 to 6-10, the absorption performance is small, the maximum absorption wavelength is not suitable, or the transmission spectrum is not steep, and there is no Ex. in which the above properties are satisfied.

TABLE 7-1

| | Ex. 6-1 | Ex. 6-2 | Ex. 6-3 | Ex. 6-4 |
|---|---|---|---|---|
| Dye | (U-1) | (U-2) | (U-5) | (U-6) |
| IR maximum absorption wavelength (nm) | 716 | 717 | 716 | 717 |
| IR absorption width (nm) | 26 | 26 | 26 | 26 |
| $\lambda$(IR15) (nm) | 679 | 679 | 679 | 679 |
| $\lambda$(IR70) (nm) | 628 | 628 | 628 | 628 |
| $\lambda$(UV15) (nm) | 405 | 407 | 408 | 408 |
| $\lambda$(UV70) (nm) | 426 | 427 | 427 | 427 |
| $\lambda$(UV50) (nm) | 416 | 417 | 418 | 419 |
| $\lambda$(IR15) − $\lambda$(IR70) (nm) | 51 | 51 | 51 | 51 |
| $\lambda$(UV70) − $\lambda$(UV15) (nm) | 21 | 20 | 19 | 19 |
| UV maximum absorption wavelength (nm) | 399 | 400 | 400 | 402 |
| Dye (A) concentration (PHR) | 9 | 9 | 9 | 9 |
| Dye (U) concentration (PHR) | 4.5 | 4.5 | 4.5 | 4.5 |
| Film thickness (μm) | 0.9 | 0.9 | 0.9 | 0.9 |
| Film thickness × dye concentration | 11.9 | 12.5 | 12.1 | 12.2 |

TABLE 7-2

| Ex. No. | Ex. 6-5 | Ex. 6-6 | Ex. 6-7 | Ex. 6-8 | Ex. 6-9 | Ex. 6-10 |
|---|---|---|---|---|---|---|
| Dye | (B-1) | (B-2) | (B-3) | (B-1) | (B-2) | (B-3) |
| IR maximum absorption wavelength (nm) | 716 | 717 | 717 | 717 | 717 | 716 |
| IR absorption width (nm) | 24 | 26 | 25 | 33 | 31 | 35 |
| $\lambda$(IR15) (nm) | 680 | 679 | 679 | 677 | 678 | 675 |
| $\lambda$(IR70) (nm) | 629 | 629 | 629 | 626 | 625 | 625 |
| $\lambda$(UV15) (nm) | Not applicable | Not applicable | Not applicable | Not applicable | Not applicable | Not applicable |
| $\lambda$(UV70) (nm) | Not applicable | Not applicable | Not applicable | 414 | 426 | 420 |
| $\lambda$(UV50) (nm) | Not applicable | Not applicable | Not applicable | 410 | Not applicable |
| $\lambda$(IR15)−$\lambda$(IR70) (nm) | 51 | 50 | 50 | 51 | 53 | 50 |
| $\lambda$(UV70)−$\lambda$(UV15) (nm) | Not applicable | Not applicable | Not applicable | Not applicable | Not applicable | Not applicable |
| UV maximum absorption wavelength (nm) | 341 | 382 | 339 | 341 | 382 | 339 |
| Dye (A) concentration (PHR) | 9 | 9 | 9 | 9 | 9 | 9 |
| Dye (U) concentration (PHR) | 4.5 | 4.5 | 4.5 | 9 | 9 | 9 |
| Film thickness (μm) | 0.9 | 0.9 | 0.9 | 1.0 | 0.9 | 0.9 |
| Film thickness × dye concentration | 12.0 | 12.2 | 12.2 | 17.4 | 16.9 | 16.1 |

Example 7

The dye (U-2), the dye (A1) shown in Table and fluorene ring-containing polyester OKP-850 were dissolved in a cyclohexanone solution, and the solution was applied to a glass substrate and dried to prepare a dye-containing transparent resin body, and the transmission spectrum at a wavelength of from 300 to 800 nm was measured. The results are shown in Table 8.

TABLE 8

| Ex. No. | Ex. 7-1 | Ex. 7-2 | Ex. 7-3 | Ex. 7-4 | Ex. 7-5 | Ex. 7-6 | Ex. 7-7 | Ex. 7-8 |
|---|---|---|---|---|---|---|---|---|
| Dye | (A1-2) | (A1-3) | (A1-4) | (A1-5) | (A1-6) | (A1-7) | (A1-8) | (A1-9) |
| IR maximum absorption wavelength (nm) | 717 | 717 | 722 | 720 | 724 | 719 | 721 | 726 |
| IR absorption width (nm) | 40 | 35 | 8 | 27 | 32 | 25 | 34 | 29 |

TABLE 8-continued

| Ex. No. | Ex. 7-1 | Ex. 7-2 | Ex. 7-3 | Ex. 7-4 | Ex. 7-5 | Ex. 7-6 | Ex. 7-7 | Ex. 7-8 |
|---|---|---|---|---|---|---|---|---|
| $\lambda$(IR15) (nm) | 667 | 676 | 691 | 683 | 685 | 683 | 682 | 668 |
| $\lambda$(IR70) (nm) | 612 | 622 | 637 | 629 | 637 | 636 | 629 | 617 |
| $\lambda$(UV15) (nm) | 410 | 410 | 410 | 409 | 409 | 410 | 409 | 409 |
| $\lambda$(UV70) (nm) | 433 | 430 | 431 | 428 | 430 | 429 | 429 | 431 |
| $\lambda$(UV50) (nm) | 421 | 420 | 420 | 420 | 420 | 420 | 420 | 420 |
| $\lambda$(IR15)-$\lambda$(IR70) (nm) | 55 | 54 | 54 | 54 | 48 | 47 | 53 | 51 |
| $\lambda$(UV70)-$\lambda$(UV15) (nm) | 23 | 20 | 21 | 19 | 21 | 19 | 20 | 22 |
| UV maximum absorption wavelength (nm) | 401 | 401 | 401 | 401 | 401 | 401 | 401 | 401 |
| Dye (A) concentration (PHR) | 9 | 9 | 9 | 9 | 9 | 9 | 9 | 9 |
| Dye (U) concentration (PHR) | 4.5 | 4.5 | 4.5 | 4.5 | 4.5 | 4.5 | 4.5 | 4.5 |
| Film thickness (μm) | 1.0 | 1.0 | 1.0 | 1.0 | 1.0 | 1.0 | 1.0 | 1.0 |
| Film thickness × dye concentration | 14.0 | 13.3 | 13.2 | 13.3 | 13.4 | 13.3 | 13.2 | 13.4 |

Example 8

A heat resistance test for samples prepared in Examples 2 to 7 was carried out. The heat resistance test was conducted in such a manner that the prepared transparent resin body-provided glass substrate was heated at 150° C. for 5 hours, an absorptivity of the dye contained at the maximum absorption wavelength was measured, and the heat resistance was evaluated by the degree of the following dye remaining ratio. The results are shown in Tables 9-1, 9-2 and 9-3.

Ex. 8-1 to 8-17 are Examples of the present invention, and the heat resistance was evaluated by the following dye remaining ratio based on the absorptivity measured at the IR maximum absorption wavelength of 680 nm and the UV maximum absorption wavelength of 415 nm. In these Examples of the present invention, the predetermined molar absorptivity at the maximum absorption wavelength is achieved, and the desired dye remaining ratio is obtained.

Ex. 8-18 to 8-26 are Comparative Examples, and the heat resistance was evaluated by the following dye remaining ratio based on absorptivities measured at the IR maximum absorption wavelength of 680 nm and the UV maximum absorption wavelength of 382 nm in Ex. 8-18 to 8-21, at the IR maximum absorption wavelength of 680 nm and the UV maximum absorption wavelength of 341 nm in Ex. 8-22 to 8-24, and at the IR maximum absorption wavelength of 680 nm and the UV maximum absorption wavelength of 339 nm in Ex. 8-25 to 8-27.

Dye remaining ratio (absorptivity at the maximum absorption wavelength 5 hours later)/(initial absorptivity at the maximum absorption wavelength)×100

Sample Nos. in Tables are Ex. Nos. in the above Examples.

With respect to the dye (U) in the present invention, as shown in Ex. 8-1 to 8-17, the dye remaining ratio is high even after heating at 150° C. for 5 hours, and a change of the transmission spectrum by a process involving heating can be suppressed. Further, although not shown in the following Table, a transparent resin body containing the dye (U) and the dye (A) in a polyimide resin or polyether sulfone resin having high Tg, showed a high dye remaining ratio (680 nm/415 nm) of at least 95%. Whereas by using the dye shown in Ex. 8-18 to 8-26, a change of the transmission spectrum by a heating process is remarkable, or no predetermined molar absorptivity is obtained, and such a sample is far from suitable for an optical filter.

TABLE 9-1

| Ex. No. | Ex. 8-1 | Ex. 8-2 | Ex. 8-3 | Ex. 8-4 | Ex. 8-5 | Ex. 8-6 | Ex. 8-7 | Ex. 8-8 |
|---|---|---|---|---|---|---|---|---|
| Transparent resin | OKP-850 | OKP-850 | OKP-850 | OKP-850 | SP1516 | SP1516 | SP1516 | B-OKP2 |
| Dye (A) | (A1-1) | (A1-1) | (A1-1) | (A1-1) | (A1-1) | (A1-1) | (A1-1) | (A1-1) |
| Dye (U) | (U-2) | (U-3) | (U-5) | (U-6) | (U-2) | (U-5) | (U-6) | (U-2) |
| Dye (A) concentration (PHR) | 9 | 9 | 9 | 9 | 9 | 9 | 9 | 9 |
| Dye (U) concentration (PHR) | 4.5 | 4.5 | 4.5 | 4.5 | 4.5 | 4.5 | 4.5 | 4.5 |
| Film thickness (μm) | 1.0 | 1.0 | 1.0 | 1.0 | 0.9 | 0.9 | 0.9 | 0.9 |
| Sample No. | Ex. 2-2 | Ex. 2-3 | Ex. 2-5 | Ex. 2-6 | Ex. 4-2 | Ex. 4-3 | Ex. 4-4 | Ex. 3-2 |
| Dye remaining ratio (680 nm) | 98% | 97% | 99% | 99% | 98% | 98% | 99% | 94% |
| Dye remaining ratio (415 nm) | 92% | 91% | 93% | 93% | 93% | 94% | 96% | 89% |

TABLE 9-2

| Ex. No. | Ex. 8-9 | Ex. 8-10 | Ex. 8-11 | Ex. 8-12 | Ex. 8-13 | Ex. 8-14 | Ex. 8-15 | Ex. 8-16 | Ex. 8-17 |
|---|---|---|---|---|---|---|---|---|---|
| Transparent resin | B-OKP2 | B-OKP2 | B-OKP2 | OKP-850 | SP3810 | SP3810 | SP3810 | OKP-850 | OKP-850 |
| Dye (A) | (A1-1) | (A1-1) | (A1-1) | (A1-1) | (A1-1) | (A1-1) | (A1-1) | (A1-1) | (A1-1) |

TABLE 9-2-continued

| Ex. No. | Ex. 8-9 | Ex. 8-10 | Ex. 8-11 | Ex. 8-12 | Ex. 8-13 | Ex. 8-14 | Ex. 8-15 | Ex. 8-16 | Ex. 8-17 |
|---|---|---|---|---|---|---|---|---|---|
| Dye (U) | (U-3) | (U-5) | (U-6) | (U-10) | (U-2) | (U-5) | (U-6) | (U-8) | (U-8) |
| Dye (A) concentration (PHR) | 9 | 9 | 9 | 9 | 9 | 9 | 9 | 9 | 9 |
| Dye (U) concentration (PHR) | 4.5 | 4.5 | 4.5 | 4.5 | 4.5 | 4.5 | 4.5 | 10 | 4.5 |
| Film thickness (μm) | 1.0 | 1.0 | 1.0 | 1.0 | 0.9 | 0.9 | 1.0 | 1.0 | 1.0 |
| Sample No. | Ex. 3-3 | Ex. 3-5 | Ex. 3-6 | Ex. 2-8 | Ex. 6-2 | Ex. 6-3 | Ex. 6-4 | Ex. 2-9 | Ex. 2-10 |
| Dye remaining ratio (680 nm) | 93% | 95% | 93% | 97% | 98% | 98% | 99% | 97% | 97% |
| Dye remaining ratio (415 nm) | 89% | 87% | 84% | 85% | 88% | 92% | 94% | 67% | 61% |

TABLE 9-3

| Ex. No. | Ex. 8-18 | Ex. 8-19 | Ex. 8-20 | Ex. 8-21 | Ex. 8-22 | Ex. 8-23 | Ex. 8-24 | Ex. 8-25 | Ex. 8-26 |
|---|---|---|---|---|---|---|---|---|---|
| Transparent resin | OKP-850 | SP1516 | SP3810 | B-OKP2 | OKP-850 | B-OKP2 | OKP-850 | SP1516 | SP3810 |
| Dye (A) | (A1-1) | (A1-1) | (A1-1) | (A1-1) | (A1-1) | (A1-1) | (A1-1) | (A1-1) | (A1-1) |
| Dye (U) | (B-2) | (B-2) | (B-2) | (B-2) | (B-1) | (B-1) | (B-3) | (B-3) | (B-3) |
| Dye (A) concentration (PHR) | 9 | 9 | 9 | 9 | 9 | 9 | 9 | 9 | 9 |
| Dye (U) concentration (PHR) | 11 | 9 | 9 | 9 | 11 | 9 | 11 | 9 | 9 |
| Film thickness (μm) | 1.0 | 0.9 | 0.9 | 0.9 | 1.0 | 1.0 | 1.0 | 0.9 | 0.9 |
| Sample No. | Ex. 2-15 | Ex. 4-10 | Ex. 6-9 | Ex. 3-12 | Ex. 2-14 | Ex. 3-11 | Ex. 2-11 | Ex. 4-11 | Ex. 6-10 |
| Dye remaining ratio (680 nm) | 96% | 100% | 99% | 95% | 95% | 94% | 97% | 91% | 88% |
| Dye remaining ratio (415 nm) | 51% | 57% | 39% | 46% | 78% | 71% | 86% | 74% | 79% |

Example 9

In Example 9, a light reflecting layer composed of a dielectric multilayer film having SiO$_2$ and TiO$_2$ alternately stacked, having the following transmission spectrum properties, was prepared. In Table 10, optical properties of the light reflecting layer at angles of incidence of 0° and 30° are shown. The average (UV shift amount) of absolute value differences at a wavelength of from 385 to 430 nm and the average (IR shift amount) of absolute value differences at a wavelength of from 600 to 700 nm between light entering from a direction at a right angle to the principal plane and light tilted 30° from the principal plane are also shown.

TABLE 10

| | Angle of incidence | |
|---|---|---|
| | 0 deg | 30 deg |
| Average transmittance at 430 to 620 nm (%) | 95.6 | 95.3 |
| Maximum transmittance at 710 to 1,100 nm (%) | 95.8 | 5.0 |
| Average transmittance at 710 to 1,100 nm (%) | 3.3 | 0.2 |
| IR50 (nm) | 721 | 692 |
| UV50 (nm) | 412 | 400 |
| IR shift amount (600 to 700 nm) (%/nm) | | 8.6 |
| UV shift amount (385 to 430 nm) (%/nm) | | 25.9 |

Example 10

The transmission spectrum of the transparent resin body in each of Examples 2 to 7 and the transmission spectrum of the dielectric multilayer film in Example 9 were multiplied to calculate the average of absolute value differences for light having a wavelength of from 385 to 430 nm and the average of absolute value differences for light having a wavelength of from 600 to 700 nm, between angles of incidence of 0° and 30°. The smaller these values, the more the change of the transmission spectrum between the 0° incidence direction and the oblique incidence direction can be suppressed. The results are shown in Tables 11-1, 11-2 and 11-3. Ex. 10-1 to 10-17 are Examples of the present invention, and Ex. 10-18 to 10-26 are Comparative Examples.

By combining the transparent resin body containing the dye (U) and the dye (A) and the dielectric multilayer film in Example 9, as shown in Ex. 10-1 to 10-17, both the average (UV shift amount) of absolute value differences for light having a wavelength of from 385 to 430 nm and the average (IR shift amount) of absolute value differences for light having a wavelength of from 600 to 700 nm, between angles of incidence of 0° and 30°, can be kept to be at most 8%/nm.

Whereas in Ex. 10-18 to 10-26, the shielding performance in the near ultraviolet region is insufficient, and the UV shift amount cannot sufficiently be suppressed in any Ex.

TABLE 11-1

| Ex. No. | Ex. 10-1 | Ex. 10-2 | Ex. 10-3 | Ex. 10-4 | Ex. 10-5 | Ex. 10-6 | Ex. 10-7 | Ex. 10-8 | Ex. 10-9 |
|---|---|---|---|---|---|---|---|---|---|
| Transparent resin | OKP-850 | OKP-850 | OKP-850 | OKP-850 | OKP-850 | B-OKP2 | B-OKP2 | B-OKP2 | B-OKP2 |
| Dye (A) concentration (PHR) | 9 | 9 | 9 | 9 | 9 | 9 | 9 | 9 | 9 |
| Dye (U) concentration (PHR) | 4.5 | 4.5 | 4.5 | 4.5 | 4.5 | 4.5 | 4.5 | 4.5 | 4.5 |
| Film thickness (μm) | 1.0 | 1.0 | 1.0 | 1.0 | 1.0 | 0.9 | 0.9 | 0.9 | 1.0 |
| Dye | (A1-1) | (A1-1) | (A1-1) | (A1-1) | (A1-1) | (A1-1) | (A1-1) | (A1-1) | (A1-1) |
| Dye | (U-2) | (U-3) | (U-4) | (U-5) | (U-6) | (U-2) | (U-3) | (U-4) | (U-5) |
| IR shift amount (600 to 700 nm) (%/nm) | 0.5 | 0.5 | 0.4 | 0.5 | 0.5 | 0.4 | 0.4 | 0.5 | 0.4 |
| UV shift amount (385 to 430 nm) (%/nm) | 4.3 | 4.6 | 4.7 | 3.6 | 3.5 | 3.8 | 4.5 | 3.5 | 3.6 |
| Film thickness (μm) × dye concentration | 13.1 | 13.4 | 13.7 | 13.1 | 13.0 | 12.7 | 12.8 | 12.7 | 13.5 |
| Sample No. | Ex. 2-2 | Ex. 2-3 | Ex. 2-4 | Ex. 2-5 | Ex. 2-6 | Ex. 3-2 | Ex. 3-3 | Ex. 3-4 | Ex. 3-5 |

TABLE 11-2

| Ex. No. | Ex. 10-10 | Ex. 10-11 | Ex. 10-12 | Ex. 10-13 | Ex. 10-14 | Ex. 10-15 | Ex. 10-16 | Ex. 10-17 |
|---|---|---|---|---|---|---|---|---|
| Transparent resin | B-OKP2 | B-OKP2 | ARTON | ARTON | ARTON | ARTON | ARTON | OKP-850 |
| Dye (A) concentration (PHR) | 9 | 9 | 6 | 6 | 6 | 6 | 6 | 9 |
| Dye (U) concentration (PHR) | 4.5 | 4.5 | 3 | 3 | 3 | 3 | 3 | 4.5 |
| Film thickness (μm) | 1.0 | 1.0 | 1.5 | 1.5 | 1.5 | 1.6 | 1.5 | 1.0 |
| Dye | (A1-1) | (A1-1) | (A1-1) | (A1-1) | (A1-1) | (A1-1) | (A1-1) | (A1-1) |
| Dye | (U-6) | (U-7) | (U-2) | (U-3) | (U-5) | (U-6) | (U-7) | (U-10) |
| IR shift amount (600 to 700 nm) (%/nm) | 0.4 | 0.4 | 0.3 | 0.3 | 0.3 | 0.3 | 0.3 | 0.4 |
| UV shift amount (385 to 430 nm) (%/nm) | 3.4 | 4.2 | 6.0 | 6.2 | 4.8 | 4.6 | 5.8 | 3.0 |
| Film thickness (μm) × dye concentration | 13.1 | 12.9 | 13.6 | 13.9 | 13.7 | 14.1 | 13.6 | 13.6 |
| Sample No. | Ex. 3-6 | Ex. 3-7 | Ex. 5-1 | Ex. 5-2 | Ex. 5-3 | Ex. 5-4 | Ex. 5-5 | Ex. 2-8 |

TABLE 11-3

| Ex. No. | Ex. 10-18 | Ex. 10-19 | Ex. 10-20 | Ex. 10-21 | Ex. 10-22 | Ex. 10-23 | Ex. 10-24 | Ex. 10-25 | Ex. 10-26 |
|---|---|---|---|---|---|---|---|---|---|
| Transparent resin | OKP-850 | OKP-850 | OKP-850 | B-OKP2 | B-OKP2 | B-OKP2 | ARTON | ARTON | ARTON |
| Dye (A) concentration (PHR) | 9 | 9 | 9 | 9 | 9 | 9 | 6 | 6 | 6 |
| Dye (U) concentration (PHR) | 11 | 11 | 11 | 13 | 13 | 13 | 3 | 3 | 3 |
| Film thickness (μm) | 1.0 | 1.0 | 1.0 | 0.9 | 0.9 | 1.0 | 1.5 | 1.5 | 1.4 |
| Dye | (A1-1) | (A1-1) | (A1-1) | (A1-1) | (A1-1) | (A1-1) | (A1-1) | (A1-1) | (A1-1) |
| Dye | (B-1) | (B-2) | (B-3) | (B-1) | (B-2) | (B-3) | (B-1) | (B-2) | (B-3) |
| IR shift amount (600 to 700 nm) (%/nm) | 0.5 | 0.6 | 0.4 | 0.5 | 0.6 | 0.4 | 0.2 | 0.2 | 0.3 |
| UV shift amount (385 to 430 nm) (%/nm) | 18.4 | 7.7 | 18.7 | 18.5 | 8.7 | 18.7 | 18.8 | 16.4 | 18.9 |
| Film thickness (μm) × dye concentration | 20.2 | 19.8 | 19.8 | 20.7 | 20.7 | 20.9 | 13.6 | 13.4 | 13.0 |
| Sample No. | Ex. 2-14 | Ex. 2-15 | Ex. 2-16 | — | — | — | Ex. 5-6 | Ex. 5-7 | Ex. 5-8 |

Example 11

The transmission spectrum of an optical filter comprising the transparent resin body of the present invention and the dielectric multilayer film prepared in Example 9 was measured within a wavelength range of from 300 to 1,200 nm. The results are shown in Table 12.

By using the transparent resin body containing the dye (U) and the dye (A), it is possible to prepare an optical filter such that while the transmittance for light having a wavelength of from 430 to 620 nm is kept high, the transmittance at a wavelength of from 350 to 395 nm and the transmittance at a wavelength of from 710 to 1,100 nm are decreased, and the dependence on the angle of incidence of the multilayer layer film caused by light having a wavelength of from 385 to 430 nm and a wavelength of from 600 to 700 nm is reduced.

in a cyclohexanone solution, and the solution was applied to a glass substrate and dried to prepare a dye-containing transparent resin body.

Polyimide resin C3450 manufactured by MITSUBISHI GAS CHEMICAL COMPANY, INC. was used in Example 12, polyimide resin C3630 manufactured by MITSUBISHI GAS CHEMICAL COMPANY, INC. was used in Example 13, polyether sulfone PES4800 manufactured by Sumitomo Chemical Co., Ltd. was used in Example 14, polyimide resin JL-20 manufactured by New Japan Chemical Co., Ltd. was used in Example 15, and polyimide resin HDN-20 manufactured by New Japan Chemical Co., Ltd. was used in Example 16.

TABLE 12

| | Ex. 11-1 | | Ex. 11-2 | | Ex. 11-3 | | Ex. 11-4 | | Ex. 11-5 | |
|---|---|---|---|---|---|---|---|---|---|---|
| Dye (A) | (A1-1) | | (A1-1) | | (A1-1) | | (A1-1) | | (A1-1) | |
| Dye (U) | (U-2) | | (U-3) | | (U-4) | | (U-5) | | (U-6) | |
| Dye (A) concentration (PHR) | 9 | | 9 | | 9 | | 9 | | 9 | |
| Dye (U) concentration (PHR) | 4.5 | | 4.5 | | 4.5 | | 4.5 | | 4.5 | |
| Transparent resin | OKP-850 | | OKP-850 | | OKP-850 | | OKP-850 | | OKP-850 | |
| Film thickness (µm) | 0.97 | | 0.99 | | 1.02 | | 0.97 | | 0.96 | |
| Angle of incidence | 0 deg | 30 deg | 0 deg | 30 deg | 0 deg | 30 deg | 0 deg | 30 deg | 0 deg | 30 deg |
| Average transmittance at 430 to 620 nm (%) | 90.9 | 90.3 | 91.4 | 90.5 | 91.4 | 90.5 | 91.4 | 90.9 | 91.3 | 90.7 |
| Maximum transmittance at 710 to 1,100 nm (%) | 0.6 | 1.4 | 0.5 | 1.2 | 0.5 | 1.1 | 0.5 | 0.9 | 0.6 | 1.0 |
| Average transmittance at 350 to 395 nm (%) | 0.33 | 0.37 | 0.18 | 0.40 | 0.42 | 0.53 | 0.42 | 0.39 | 0.32 | 0.29 |
| IR shift amount (600 to 700 nm) (%/nm) | 1.6 | | 1.6 | | 1.7 | | 1.6 | | 1.4 | |
| UV shift amount (385 to 450 nm) (%/nm) | 4.5 | | 5.8 | | 6.1 | | 5.4 | | 5.4 | |
| IR shift amount (600 to 700 nm) before addition of dye (%/nm) | 8.6 | | 8.6 | | 8.6 | | 8.6 | | 8.6 | |
| UV shift amount (385 to 430 nm) before addition of dye (%/nm) | 25.9 | | 25.9 | | 25.9 | | 25.9 | | 25.9 | |
| Sample No. | Ex. 2-2 | | Ex. 2-3 | | Ex. 2-4 | | Ex. 2-5 | | Ex. 2-6 | |

Examples 12 to 16

The dye (U), the dye (A1-1) and the following polyimide resin or the following polyether sulfone resin were dissolved Further, with respect to the transparent resin bodies prepared in Examples 12 to 16, the transmission spectrum at a wavelength of from 300 to 800 nm was measured. The measurement results are shown in Tables 13-1 and 13-2.

TABLE 13-1

| Ex. No. | Ex. 12 | Ex. 13-1 | Ex. 13-2 | Ex. 13-3 | Ex. 13-4 | Ex. 13-5 | Ex. 13-6 |
|---|---|---|---|---|---|---|---|
| Transparent resin | C3450 | | | C3630 | | | |
| Dye (A) | (A1-1) | | | (A1-1) | | | |
| Dye (U) | (U-2) | (U-2) | (U-6) | (U-17) | (U-18) | (U-5) | (U-7) |
| IR maximum absorption wavelength (nm) | 716 | 716 | 716 | 716 | 716 | 716 | 716 |
| IR absorption width (nm) | 20 | 7 | 0 | 0 | 0 | 0 | 0 |
| $\lambda(IR15)$ (nm) | 678 | 685 | 685 | 686 | 689 | 687 | 687 |
| $\lambda(IR70)$ (nm) | 623 | 633 | 633 | 634 | 637 | 635 | 635 |
| $\lambda(UV15)$ (nm) | 407 | 405 | 407 | 404 | 402 | 406 | 405 |
| $\lambda(UV70)$ (nm) | 426 | 421 | 422 | 419 | 417 | 421 | 421 |
| $\lambda(UV50)$ (nm) | 416 | 414 | 416 | 412 | 411 | 415 | 414 |
| $\lambda(IR15)-\lambda(IR70)$ (nm) | 55 | 52 | 52 | 52 | 52 | 52 | 52 |
| $\lambda(UV70)-\lambda(UV15)$ (nm) | 19 | 16 | 15 | 15 | 15 | 15 | 16 |
| UV maximum absorption wavelength (nm) | 398 | 397 | 399 | 395 | 394 | 398 | 399 |
| Dye (A) concentration (PHR) | 8.6 | 6 | 6 | 6 | 6 | 6 | 6 |
| Dye (U) concentration (PHR) | 4.5 | 4.5 | 4.5 | 4.5 | 4.5 | 4.5 | 4.5 |
| Film thickness (µm) | 1.0 | 1.0 | 1.0 | 1.0 | 1.0 | 1.0 | 1.0 |
| Film thickness (µm) × dye concentration | 12.6 | 10.5 | 10.5 | 10.5 | 10.5 | 10.5 | 10.5 |

TABLE 13-2

| Ex. No. | Ex. 13-7 | Ex. 13-8 | Ex. 13-9 | Ex. 13-10 | Ex. 14 | Ex. 15 | Ex. 16 |
|---|---|---|---|---|---|---|---|
| Transparent resin | | | C3630 | | PES4800 | JL-20 | HDN-20 |
| Dye (A) | | | (A1-1) | | (A1-1) | (A1-1) | (A1-1) |
| Dye (U) | (U-12) | (U-4) | (U-1) | (U-10) | (U-2) | (U-2) | (U-2) |
| IR maximum absorption wavelength (nm) | 716 | 716 | 716 | 716 | 716 | 718 | 714 |
| IR absorption width (nm) | 0 | 0 | 0 | 0 | 30 | 0 | 0 |
| $\lambda$(IR15) (nm) | 687 | 687 | 687 | 687 | 675 | 686 | 690 |
| $\lambda$(IR70) (nm) | 634 | 635 | 635 | 635 | 618 | 628 | 632 |
| $\lambda$(UV15) (nm) | 407 | 406 | 405 | 423 | 408 | 407 | 403 |
| $\lambda$(UV70) (nm) | 423 | 420 | 420 | 437 | 428 | 423 | 420 |
| $\lambda$(UV50) (nm) | 416 | 414 | 413 | 431 | 418 | 416 | 413 |
| $\lambda$(IR15)-$\lambda$(IR70) (nm) | 53 | 52 | 52 | 52 | 57 | 58 | 58 |
| $\lambda$(UV70)-$\lambda$(UV15) (nm) | 16 | 14 | 15 | 14 | 20 | 16 | 17 |
| UV maximum absorption wavelength (nm) | 400 | 396 | 396 | 413 | 399 | 399 | 396 |
| Dye (A) concentration (PHR) | 6 | 6 | 6 | 6 | 8 | 6 | 6 |
| Dye (U) concentration (PHR) | 4.5 | 4.5 | 4.5 | 4.5 | 4.5 | 4.5 | 4.5 |
| Film thickness (μm) | 1.0 | 1.0 | 1.0 | 1.0 | 1.0 | 1.1 | 1.0 |
| Film thickness (μm) × dye concentration | 10.5 | 10.5 | 10.5 | 10.5 | 12.9 | 11.3 | 10.4 |

As shown in Tables, in Ex. 12 to 16, the difference ($\lambda$(UV70)–$\lambda$(UV15)) between the wavelength $\lambda$(UV15) at which the transmittance is 15% and the wavelength $\lambda$(UV70) at which the transmittance is 70% within a wavelength range of from 380 to 430 nm is at most 30 nm and the wavelength $\lambda$(UV50) at which the transmittance is 50% is within a wavelength range of from 400 to 440 nm, and sufficient shielding performance is obtained within a desired wavelength range even with a film thickness of about 1.0 μm. In such a manner, the wavelength $\lambda$(UV50) is within a wavelength range of from 400 to 440 nm and is within a wavelength band suitable as an optical filter.

Here, the wavelength band (IR absorption width) at which the transmittance is at most 1% within a wavelength range of from 650 to 800 nm is less than 30 nm, however, by using absorptive glass as a transparent substrate, the transmittance at the above wavelength can be decreased, and sufficient shielding performance is obtained.

Example 17

In Example 17, an optical filter comprising a transparent resin body containing the dye (U) and the dye (A) in a polyimide resin or a polyether sulfone resin, and the dielectric multilayer film in Example 9, is prepared. In Table 14, the averages (UV shift amount, IR shift amount) of the absolute value differences for light having a wavelength of from 385 to 430 nm and for light having a wavelength of from 600 to 700 nm between angles of incidence of 0° and 30°, calculated by multiplying the transmission spectrum of the transparent resin body and the transmission spectrum of the dielectric multilayer film, are also shown. It is evident from the results that both the UV shift amount and the IR shift amount can be kept to be at most 8%/nm.

TABLE 14

| Ex. No. | Ex. 17-1 | | Ex. 17-2 | | Ex. 17-3 | |
|---|---|---|---|---|---|---|
| Dye (A) | | | (A1-1) | | | |
| Dye (U) | (U-2) | | (U-2) | | (U-2) | |
| Dye (A) concentration (PHR) | 8.6 | | 9.7 | | 8.4 | |
| Dye (U) concentration (PHR) | 4.5 | | 4.5 | | 4.5 | |
| Transparent resin | C3630 | | C3450 | | PES4800 | |
| Film thickness (μm) | 1.0 | | 1.0 | | 1.0 | |
| Angle of incidence | 0 deg | 30 deg | 0 deg | 30 deg | 0 deg | 30 deg |
| Average transmittance at 430 to 620 nm (%) | 91.7 | 91.5 | 91.4 | 91.1 | 88.6 | 88.2 |
| Maximum transmittance at 710 to 1,100 nm (%) | 0.6 | 1.0 | 0.7 | 1.0 | 0.4 | 0.9 |
| Average transmittance at 350 to 395 nm (%) | 0.04 | 0.10 | 0.04 | 0.10 | 0.04 | 0.10 |
| IR shift amount (600 to 700 nm) (%/nm) | 1.6 | | 1.6 | | 1.4 | |
| UV shift amount (385 to 450 nm) (%/nm) | 4.5 | | 4.2 | | 4.1 | |
| IR shift amount (600 to 700 nm) before addition of dye (%/nm) | 8.6 | | 8.6 | | 8.6 | |
| UV shift amount (385 to 430 nm) before addition of dye (%/nm) | 25.9 | | 25.9 | | 25.9 | |

Example 18

In Example 18, using as a transparent substrate fluorophosphate glass NF-50TX (manufactured by Asahi Glass Company, Limited) having a thickness of 0.21 mm, an optical filter comprising a transparent resin body containing the dye (U) and the dye (A) in a polyester resin or a polyimide resin and the dielectric multilayer film in Example 9 is prepared.

In Table 15, the averages (UV shift amount, IR shift amount) of the absolute value differences for light having a wavelength of from 385 to 430 nm and for light having a wavelength of from 600 to 700 nm between angles of incidence of 0° and 30°, calculated by multiplying the transmission spectrum of the transparent resin body and the transmission spectrum of the dielectric multilayer film, are also shown. It is evident from the results that both the UV shift amount and the IR shift amount can be kept to be at most 8%/nm.

TABLE 15

| Ex. No. | Ex. 18-1 | | Ex. 18-2 | | Ex. 18-3 | | Ex. 18-4 | | Ex. 18-5 | |
|---|---|---|---|---|---|---|---|---|---|---|
| Dye (A) | | | | | (A1-1) | | | | | |
| Dye (U) | (U-2) | | (U-2) | | (U-2) | | (U-2) | | (U-2) | |
| Dye (A) concentration (PHR) | 6.8 | | 6.0 | | 5.1 | | 7.5 | | 5.0 | |
| Dye (U) concentration (PHR) | 4.5 | | 4.5 | | 3.5 | | 4.5 | | 4.5 | |
| Transparen resin | OKP-850 | | JL-20 | | C3630 | | HDN-20 | | TP01 | |
| Film thickness (μm) | 1.1 | | 1.1 | | 1.3 | | 1.0 | | 1.0 | |
| Angle of incidence | 0 deg | 30 deg | 0 deg | 30 deg | 0 deg | 30 deg | 0 deg | 30 deg | 0 deg | 30 deg |
| Average transmittance at nm 430 to 620 (%) | 86.6 | 85.9 | 86.1 | 86.7 | 87.2 | 86.7 | 86.3 | 86.0 | 86.9 | 86.1 |
| Maximum transmittance at 710 to 1,100 nm (%) | 0.7 | 1.5 | 0.5 | 1.1 | 0.7 | 1.0 | 0.9 | 1.1 | 1.0 | 1.0 |
| Average transmittance at 350 to 395 nm (%) | 0.41 | 1.51 | 0.30 | 0.41 | 0.34 | 0.57 | 0.37 | 0.90 | 0.31 | 0.56 |
| IR shift amount (600 to 700 nm) (%/nm) | | 2.5 | | 2.3 | | 2.6 | | 3.2 | | 2.9 |
| UV shift amount (385 to 450 nm) (%/nm) | | 5.8 | | 3.3 | | 3.4 | | 4.3 | | 2.7 |

Example 19

In Example 19, with respect to 6 samples in Example 13, a high temperature high humidity test was carried out, and the amount of change of λ(UV50) between before and after the test was confirmed. The high temperature high humidity test was conducted at 85° C. under 85% for 250 hours, and measured values of λ(UV50) before and after the test were compared.

In Table 16, the amount of change of λ(UV50) before and after the high temperature high humidity test is shown, and in each Ex., the absolute value of the amount of change was at most 2 nm. Further, in Ex. 19-1 to 19-4, the absolute value of the amount of change of λ(UV50) is at most 1.2 nm and is kept low. These results show that $R^2$ and $R^3$ in the dye (U) are alkyl groups and thus the dye (U) is hydrophobic, and accordingly the change of optical properties is small even when the dye is exposed to high temperature and high humidity environment.

TABLE 16

| Ex. No. | Ex. 19-1 | Ex. 19-2 | Ex. 19-3 | Ex. 19-4 | Ex. 19-5 | Ex. 19-6 |
|---|---|---|---|---|---|---|
| Dye (A) | | | (A1-1) | | | |
| Dye (U) | (U-2) | (U-6) | (U-5) | (U-7) | (U-4) | (U-1) |
| IR maximum absorption wavelength (nm) | 716 | 716 | 716 | 716 | 716 | 716 |
| IR absorption width (nm) | 7 | 0 | 0 | 0 | 0 | 0 |
| λ(IR15) (nm) | 685 | 685 | 687 | 687 | 687 | 687 |
| λ(IR70) (nm) | 633 | 633 | 635 | 635 | 635 | 635 |
| λ(UV15) (nm) | 405 | 407 | 406 | 405 | 406 | 405 |
| λ(UV70) (nm) | 421 | 422 | 421 | 421 | 420 | 420 |
| λ(UV50) (nm) | 414 | 416 | 415 | 414 | 414 | 413 |
| λ(IR15)-λ(IR70) (nm) | 52 | 52 | 52 | 52 | 52 | 52 |
| λ(UV70)-λ(UV15) (nm) | 16 | 15 | 15 | 16 | 14 | 15 |
| UV maximum absorption wavelength (nm) | 397 | 399 | 398 | 399 | 396 | 396 |
| Dye (A) concentration (PHR) | 6 | 6 | 6 | 6 | 6 | 6 |
| Dye (U) concentration (PHR) | 4.5 | 4.5 | 4.5 | 4.5 | 4.5 | 4.5 |
| Film thickness (μm) | 1.0 | 1.0 | 1.0 | 1.0 | 1.0 | 1.0 |
| Amount of change of λ(UV50) between before and after test (nm) | −1.2 | −1.2 | −1.2 | −1.0 | −1.5 | −1.6 |
| Sample No. | Ex. 13-1 | Ex. 13-2 | Ex. 13-5 | Ex. 13-6 | Ex. 13-8 | Ex. 13-9 |

INDUSTRIAL APPLICABILITY

The optical filter of the present invention is useful as an imaging device using a solid-state imaging element, such as a digital still camera or a mobile phone, and a display device using a light receiving element, such as an automatic exposure meter.

This is a Continuation of U.S. application Ser. No. 15/454,521, filed Mar. 9, 2017, which is a continuation of PCT Application No. PCT/JP2015/076052, filed on Sep. 14, 2015, which is based upon and claims the benefit of priority from Japanese Patent Application No. 2014-191601 filed on Sep. 19, 2014. The contents of those applications are incorporated herein by reference in their entireties.

REFERENCE SYMBOLS

11: Transparent substrate
12: Absorbing layer
13: Light reflecting layer

The invention claimed is:

1. An optical filter comprising a transparent resin body comprising a transparent resin and having a single layer or multilayer structure, wherein the transparent resin body contains a near ultraviolet absorbing dye (U) which has an absorption maximum at a wavelength of from 370 to 425 nm and a near infrared absorbing dye (A) which has an absorption maximum at a wavelength of from 600 to 800 nm, the optical filter has a wavelength λ(U50) at which the transmittance is 50% in a wavelength band of from 400 to 440 nm, and the optical filter satisfies the following requirements (1), (2) and (4) to (8):
   (1) there are a wavelength λ(UV15) at which the transmittance is 15% and a wavelength λ(UV70) at which the transmittance is 70% in a wavelength band of from 380 to 450 nm, and λ(UV70)-λ(UV15)30 nm,
   (2) there are a wavelength λ(IR15) at which the transmittance is 15% and a wavelength λ(IR70) at which the transmittance is 70% in a wavelength band of from 600 to 720 nm, and λ(IR15)–λ(IR70)60 nm, and
   (4) in a spectral transmittance curve at an angle of incidence of 0°, the average transmittance in a wavelength band of from 430 to 620 nm is at least 80%,
   (5) in a spectral transmittance curve at an angle of incidence of 0°, the average transmittance in a wavelength band of from 350 to 395 nm is at most 3%,
   (6) in a spectral transmittance curve at an angle of incidence of 0°, the average transmittance in a wavelength band of from 710 to 1,100 nm is at most 2%,
   (7) in spectral transmittance curves at an angle of incidence of 0° and at an angle of incidence of 30°, the average of absolute values of differences between the transmittance at an angle of incidence of 0° and the transmittance at an angle of incidence of 30° in a wavelength band of from 385 nm to 430 nm is at most 8 [%/nm], and
   (8) in spectral transmittance curves at an angle of incidence of 0° and at an angle of incidence of 30°, the average of absolute values of differences between the transmittance at an angle of incidence of 0° and the transmittance at an angle of incidence of 30° in a wavelength band of from 600 nm to 700 nm is at most 8 [%/nm].

2. The optical filter according to claim 1, wherein the light reflecting layer satisfies the following requirements (9) to (12):
   (9) in a spectral transmittance curve at an angle of incidence of 0°, the average transmittance in a wavelength band of from 430 to 620 nm is at least 90%,
   (10) in a spectral transmittance curve at an angle of incidence of 0°, the average transmittance in a wavelength band of from 710 to 1,100 nm is at most 10%,
   (11) there is a wavelength at which the transmittance is 50% in a wavelength band of from 380 to 430 nm, and
   (12) there is a wavelength at which the transmittance is 50% in a wavelength band of from 650 to 750 nm.

3. The optical filter according to claim 1, wherein the following formula is satisfied, where α(μm) is the average thickness of the transparent resin body, and β is the total mass of the dye (U) and the dye (A) in 100 parts by mass of the transparent resin:

α×β≤20.

4. The optical filter according to claim 1, wherein the transparent resin is a thermoplastic resin or a curable resin and has a refractive index of at least 1.45.

5. The optical filter according to claim 1, wherein the transparent resin is at least one member selected from the group consisting of an acrylic resin, an epoxy resin, an enethiol resin, a polycarbonate resin, a polyether resin, a polyarylate resin, a polysulfone resin, a polyether sulfone resin, a polyparaphenylene resin, a polyarylene ether phosphine oxide resin, a polyimide resin, a polyamide imide resin, a polyolefin resin, a cyclic olefin resin and a polyester resin.

6. The optical filter according to claim 1, wherein the transparent resin has a glass transition temperature Tg of from 200 to 360° C.

7. The optical filter according to claim 1, wherein the dye (U) is a dye having a molar absorptivity at the maximum absorption wavelength of at least 60,000 [L/(mol·cm)].

8. The optical filter according to claim 1, wherein the dye (A) is at least one dye selected from the group consisting of a squarylium dye, a phthalocyanine dye and a cyanine dye.

9. The optical filter according to claim 1, wherein the dye (A) comprises at least a squarylium dye.

10. The optical filter according to claim 1, wherein α×β≤16 and α≤5 μm, where wherein α (μm) is the average thickness of the transparent resin body, and β is the total mass of the dye (U) and the dye (A) in 100 parts by mass of the transparent resin.

11. The optical filter according to claim 1, wherein the transparent resin body is composed of a film or sheet having a single layer or a multilayer structure, or a film having a single layer or a multilayer structure on a transparent substrate.

12. The optical filter according to claim 11, wherein the transparent substrate is an absorptive glass substrate.

13. The optical filter according to claim 1, wherein the dye (U) is a compound represented by the following formula (U):

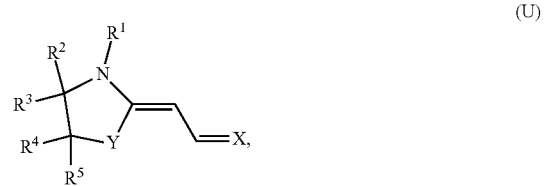

wherein Y is an oxygen atom, or a methylene group or a dimethylene group to which $R^6$ and $R^7$ are bonded, $R^1$ is a $C_{1-16}$ monovalent hydrocarbon group which may have a substituent, $R_2$ to $R_7$ are each independently a hydrogen atom, a halogen atom, or a $C_{1-10}$ alkyl group or alkoxy group, and X is a bivalent group represented by a formula selected from the group consisting of the following formulas (X1) to (X5), wherein $R^8$ and $R^9$ are each independently a $C_{1-12}$ monovalent hydrocarbon group which may have a substituent, and $R^{10}$ to $R^{19}$ are each independently a hydrogen atom, or a $C_{1-12}$ monovalent hydrocarbon group which may have a substituent:

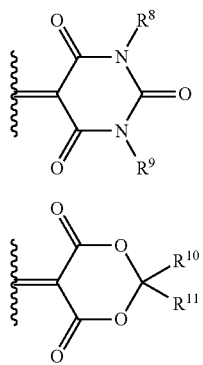

(X1)

(X2)

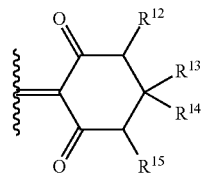

(X3)

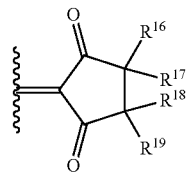

(X4)

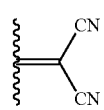

(X5)

* * * * *